(12) United States Patent
Inagaki

(10) Patent No.: US 9,109,718 B2
(45) Date of Patent: Aug. 18, 2015

(54) PILOT RELAY

(75) Inventor: Yohsuke Inagaki, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 540 days.

(21) Appl. No.: 13/432,332

(22) Filed: Mar. 28, 2012

(65) Prior Publication Data
US 2012/0248363 A1 Oct. 4, 2012

(30) Foreign Application Priority Data

Mar. 30, 2011 (JP) ................................. 2011-076888

(51) Int. Cl.
| F16K 11/07 | (2006.01) |
| F16K 31/126 | (2006.01) |
| F15B 5/00 | (2006.01) |
| F15B 13/043 | (2006.01) |
| F15B 13/04 | (2006.01) |

(52) U.S. Cl.
CPC ............ *F16K 31/1266* (2013.01); *F15B 5/006* (2013.01); *F15B 13/0433* (2013.01); *F16K 31/1268* (2013.01); *F15B 13/0405* (2013.01)

(58) Field of Classification Search
CPC ............ F16K 31/1268; F16K 31/1266; F16K 11/0716; F15B 13/0405; F15B 13/0433; F15B 5/006
USPC ......... 137/625.68, 625.66, 596.18, 596.2, 85, 137/116.5, 627.5, 628, 614.11, 614.13; 251/61.1
See application file for complete search history.

(56) References Cited

U.S. PATENT DOCUMENTS

| 2,484,888 | A | * | 10/1949 | Hollerith | 137/625.66 |
| 2,711,757 | A | * | 6/1955 | Gardner | 137/596.2 |
| 2,735,441 | A | * | 2/1956 | Regna | 137/627.5 |
| 3,180,347 | A | * | 4/1965 | Henderson | 137/625.66 |
| 3,958,495 | A | * | 5/1976 | Bernhoft | 137/625.66 |
| 3,998,111 | A | * | 12/1976 | Blake | 137/625.68 |
| 4,117,865 | A | * | 10/1978 | Beck | 137/596.18 |
| 4,318,333 | A | * | 3/1982 | Cemenska | 137/625.68 |
| 4,576,200 | A | * | 3/1986 | Janecke et al. | 137/625.66 |
| 4,790,354 | A | * | 12/1988 | Goans | 137/625.66 |
| 8,464,753 | B2 | * | 6/2013 | Schmidt et al. | 137/596.18 |
| 8,613,292 | B2 | * | 12/2013 | Miyazoe et al. | 137/596.18 |

FOREIGN PATENT DOCUMENTS

| JP | H08-270604 | 10/1996 |
| JP | 2001-75651 A | 3/2001 |
| JP | 2004-360805 A | 12/2004 |

OTHER PUBLICATIONS

Japanese Office Action dated Jun. 20, 2014 (previously submitted Jul. 25, 2014), which issued during prosecution of Japanese Patent Application No. 2011-076888, which corresponds to the present application. English translation attached.

\* cited by examiner

*Primary Examiner* — Craig Schneider
*Assistant Examiner* — Craig J Price
(74) *Attorney, Agent, or Firm* — Troutman Sanders LLP

(57) ABSTRACT

A poppet valve assembly is structured divided into a seat portion and a seat retaining portion. A spring is contained within an interior space between the seat portion and the seat retaining portion, where a poppet valve is held between the seat portion and the seat retaining portion in a state biased by the spring. The poppet valve is provided with a through hole for connecting a chamber that contains the spring and a discharge air duct of a spool, and a fine connecting duct for connecting the through hole and an output air pressure chamber. The chamber that contains the spring is separated from a supply air pressure chamber by an O-ring.

2 Claims, 20 Drawing Sheets

(a)

(b)

PILOT RELAY

CROSS REFERENCE TO RELATED APPLICATIONS

The present application claims priority under 35 U.S.C. §119 to Japanese Patent Application No. 2011-076888, filed Mar. 30, 2011, which is incorporated herein by reference.

FIELD OF TECHNOLOGY

The present invention relates to a pilot relay that is used in a positioner, or the like, for controlling the degree of opening of a regulator valve (a valve) of a pneumatically actuated type.

BACKGROUND

Conventionally, positioners have been used in controlling the driving of valves and in controlling the driving of process automation and other common industrial equipment, enabling the control of the degree of opening of a valve through attaching the positioner to the valve.

FIG. 20 illustrates the structure of the critical portions of a positioner that enables the control of the degree of opening of a valve. In this diagram, 100 is a positioner, where this positioner 100 is structured from an electro-pneumatic converting portion 101 for converting to a pneumatic signal Pn a valve opening signal that is sent in an electric signal from a higher-level controller 200, and a pilot relay (pressure signal amplifying device) 102 for amplifying the air pressure signal (input air pressure) Pn, converted by this electro-pneumatic converting portion 101, and outputting it to a valve 300 as an output air pressure signal (output air pressure) Po.

The pilot relay 102 used in such a positioner 100 may be of the single-action type, wherein a single output air pressure Po is outputted for a single input air pressure Pn, or a double-action type, wherein two output air pressures Po1 and P-o2 are outputted in relation to a single input pressure Pn. The double-action pilot relay 102 has two output ports, where the output air pressure Po1 of the first output port is higher than the output air pressure Po2 of the second output port when the valve 300 is operated in the forward direction, and the output air pressure Po2 of the second port is higher than the output air pressure Po1 of the first port when operated in the reverse direction.

FIG. 21 illustrates a structure of a single-action pilot relay. In this figure, 401 is a housing, where an input air pressure chamber 402, a supply air pressure chamber 403, an output air pressure chamber 404, and a discharge air chamber 405 are provided within the housing 401. Moreover, a diaphragm 406 that is displaced by the input air pressure (the nozzle back pressure) Pn that is directed into the input air pressure chamber 402 is provided within the housing 401, where a valve driving member (a movable body) 407 is provided on the diaphragm 406 so as to be able to move in the direction of the arrow A and the direction of the arrow B. The valve driving member 407 has an opening 407a located at the output air pressure chamber 404, and a discharge air duct 407b that connects the opening 407a to the discharge air chamber 405. Moreover, the output air pressure chamber 404 and the discharge air chamber 405 are separated by a diaphragm 408, where this diaphragm 408 is provided between the housing 401 and the valve driving member 407.

A dividing wall 409 is provided between the supply air pressure chamber 403 and the output air pressure chamber 404. A connecting hole 409a, for connecting between the supply air pressure chamber 403 and the output air pressure chamber 404, is formed in this dividing wall 409. Moreover, a poppet valve 410, that can move to the left and the right, is provided through this connecting hole 409a. The poppet valve 410 has, integrally, a discharge air valve 410a for opening and closing the opening 407a of the valve driving member 407, and a supply air valve 410b for opening and closing the connecting hole 409a of the dividing wall 409. Moreover, the output air pressure chamber 404 is provided with a spring 411 for biasing the poppet valve 410 in the direction of the arrow B, that is, in the direction wherein the supply air valve 410b closes the connecting hole 409a.

In this pilot relay supply air pressure Ps is supplied through an air supplying pipe 412 to the supply air pressure chamber 403, and the input air pressure Pn is directed to the input air pressure chamber 402 through a nozzle back pressure injecting pipe 413. Moreover, the output air pressure Po is outputted to the valve 300 from the output air pressure chamber 404 through an air outputting pipe 414. Note that the discharge air chamber 405 is connected to atmosphere.

In this pilot relay, when the input air pressure Pn is increased, the diaphragms 406 and 408 move to the side of the arrow A, and, concomitantly, the valve driving member 407 that is supported on the diaphragms 406 and 408 moves to the side of the arrow A. As a result, the valve driving member 407, in accordance with this movement, pushes the poppet valve 410 downward against the biasing force of the spring 411, and, accordingly, the supply air valve 410b of the poppet valve 410 opens the connecting hole 409a. At this time, the opening 407a of the valve driving member 407 is closed by the discharge air valve 410a of the poppet valve 410.

As a result, the air that is supplied to the supply air pressure chamber 403 through the air supplying pipe 412 is introduced into the output air pressure chamber 404 through the connecting hole 409a, to be supplied to the valve 300 through the air outputting pipe 414.

On the other hand, when the input air pressure Pn is decreased, the diaphragms 406 and 408 move to the side of the arrow B, and, concomitantly, the valve driving member 407 that is supported on the diaphragms 406 and 408 moves to the side of the arrow B. At this point, the poppet valve 410 is pushed upward by the biasing force of the spring 411, and, accordingly, the supply air valve 410b of the poppet valve 410 closes the connecting hole 409a. At this time, the opening 407a of the valve driving member 407 is opened by the discharge air valve 410a of the poppet valve 410. As a result, the air within the output air pressure chamber 404 enters into the discharge air duct 407b through the opening 407a of the valve driving member 407, to be discharged to the discharge air chamber 405.

In this way, the valve driving member 407 and the poppet valve 410 are actuated by the input air pressure Pn that is directed into the input air pressure chamber 402, where the action thereof causes the amplified output air pressure Po to be outputted to the valve 300 through the air outputting pipe 414. In this case, the output air pressure Po can be adjusted through adjusting the pressure of the input air pressure Pn.

In this pilot relay, the input pressure is expressed by $An \times Pn$, the product of the input air pressure Pn and the effective surface area An of the diaphragm (the input diaphragm) 406, and the output pressure is expressed as $Ao \times Po$, the product of the output air pressure Po and the effective surface area Ao of the diaphragm (the output diaphragm) 408.

When the input pressure $An \times Pn$ is in equilibrium with the output pressure $Ao \times Po$, then the supply air valve 410b is seated in the connecting hole 409a of the dividing wall 409, and, at the same time, the discharge air valve 410a is seated in the opening 407a of the valve driving member 407, and both the supply air and the discharge air is stopped. That is, when the input pressure and the output pressure are in equilibrium, the equation of $An \times Pn = Ao \times Po$ is satisfied.

In this pilot relay, the ratio of the output air pressure Po to the input air pressure Pn is defined as the gain G (CG=Po/Pn). Because the equation $An \times Pn = Ao \times Po$ is satisfied, this gain G is Po/Pn=An/Ao, so the gain C can be expressed as C=An/Ao. The higher this gain G, the higher the output air pressure Po, depending on the input air pressure Pn, making it possible to increase the responsiveness of a positioner. Given this, in order to achieve an increase in gain in the pilot relay, either the effective surface area An that bears the input air pressure Pn must be increased, or the effective surface area Ao that bears the output air pressure Po must be decreased.

In this case, when the effective surface area An that bears the input air pressure Pn is increased, this leads to a decrease in responsiveness. Moreover, this is undesirable because it leads to an increase in the size of the pilot relay area. Because of this, rather than increasing the effective surface area An that bears the input air pressure Pn, preferably the effective surface area Ao that bears the output air pressure Po is decreased.

Moreover, in this pilot relay, a force that is determined by the difference between the supply air pressure Ps and the output air pressure Po, and by the diameter of the supply air port, acts on the supply air valve 410b of the poppet valve 410, given the structure thereof. This acting force is because of a dead band wherein there is no switching between supplying air and discharging air in relation to a change in the input air pressure Pn (See, for example, Japanese Unexamined Patent Application Publication 2001-75651 ("JP '651") (Paragraphs 0021 through 0023)).

Given this, in order to ameliorate the non-linear properties of the supplying air and discharging air due to the dead band, in the pilot relay set forth in JP '651 a relatively large-diameter bleed hole is provided, so that the output air pressure can escape to atmosphere. Moreover, in the pilot relay set forth in Japanese Unexamined Patent Application Publication 2004-360805 ("JP '805"), a bleed hole with a relatively large diameter is provided so that the supply air pressure is introduced into the output air pressure chamber, to escape to atmosphere.

However, in the pilot relays set forth in JP '651 and JP '805, in order to quickly settle the output air pressure after a discharge operation it is necessary for the bleed rate to be large, and there is a problem in that this increases the steady-state air consumption rate.

The present invention is to solve this problem, and the object thereof is to provide a pilot relay wherein it is possible to increase the speed of settling of the output air pressure, without increasing the bleed rate.

SUMMARY

An example of the present invention, in order to achieve the object set forth above, is a pilot relay having an input air pressure chamber, a supply air pressure chamber, an output air pressure chamber, and a discharge air chamber formed within a housing; a diaphragm for dislocation by input air pressure that is directed into the input air pressure chamber; a moveable body that has an opening located in the output air pressure chamber and a discharge air duct that connects this opening to the discharge air chamber, and that is supported on the diaphragm to move within the housing; a poppet valve that is provided so as to be able to move through a connecting hole that is formed in a dividing wall that divides the supply air pressure chamber and the output air pressure chamber, and that has, integrally, a discharge air valve for opening and closing an opening of the moveable body and a supply air valve for opening and closing the connecting hole; and a spring member for biasing the poppet valve in the direction wherein the supply air valve closes the connecting hole; including a poppet valve assembly having a space for containing the spring member and the dividing wall, wherein the poppet valve and the spring member are held in a state wherein the discharge air valve protrudes from the connecting hole that is formed in the dividing wall; where the poppet valve has a connecting duct for connecting to either a space for containing the spring member, which is connected to atmosphere, or to the discharge air chamber, and a fine connecting duct for connecting the connecting duct to the output air pressure chamber.

In this invention, the poppet valve has a connecting duct for connecting to either a space for containing a spring member that is connected to atmosphere, or a discharge air chamber. Moreover, the connecting duct has a fine connecting duct for connecting to the output air pressure chamber.

When the poppet valve has a connecting duct for connecting to the discharge air chamber, then, at the time of a discharge action, in the fine connecting duct the air of the output air pressure chamber flows out to the discharge air chamber through the connecting duct of the poppet valve, and is directed into the space for containing the spring member, so that the connecting hole is closed quickly by the supply air valve of the poppet valve. In this case, the space for containing the spring member goes to atmospheric pressure, and thus the force for closing the supply air port is secured by the poppet valve, while greatly decreasing the force that is applied to the poppet valve by the supply air pressure. As a result, the dead band is reduced, and the amount of pressure reduction of the output air pressure due to the fine connecting duct is reduced, making it possible to increase the speed of settling of the output air pressure without increasing the bleed rate.

When the poppet valve has a connecting duct for connecting to a space that contains the spring member, connected to atmosphere, then, at the time of a discharge action, in the fine connecting duct the air of the output air pressure chamber is directed into the space for containing the spring member through the connecting duct of the poppet valve, and flows out to atmosphere, so that the connecting hole is closed quickly by the supply air valve of the poppet valve. In this case, the space for containing the spring member goes to atmospheric pressure, and thus the force for closing the supply air port is secured by the poppet valve, while greatly decreasing the force that is applied to the poppet valve by the supply air pressure. As a result, the dead band is reduced, and the amount of pressure reduction of the output air pressure due to the fine connecting duct is reduced, making it possible to increase the speed of settling of the output air pressure without increasing the bleed rate.

Note that the ability to increase the speed of settling of the output air pressure without increasing the bleed rate means that the settling of the output air pressure is not slower even if the bleed rate is reduced. This means that even if the bleed rate is reduced it is possible to increase the speed of settling of the output air pressure, or in other words, that it is possible to reduce the steady-state air consumption rate by reducing the diameter of the fine connecting duct. Moreover, the present invention can be applied not only to single-action pilot relays, but similarly to double-action pilot relays as well.

The examples of the present invention make it possible to increase the speed of settling of the output air pressure without increasing the bleed rate, by reducing the amount of pressure drop in the output air pressure due to the fine connecting duct and reducing the dead band, through reducing greatly the pressure that is applied to the poppet valve by the supply air pressure while maintaining the force for closing the supply air port by the poppet valve through having the space for containing the spring member be at atmospheric pressure, through providing, in a poppet valve, a connecting duct for connecting, to either a space for containing a spring member, connected to atmosphere, or a discharge air chamber, and a fine connecting duct for connecting this connecting duct to the output air pressure chamber. This also makes it possible to reduce the steady-state air consumption rate by reducing the diameter of the fine connecting duct.

DETAILED DESCRIPTION

Examples according to the present invention are explained below in detail, based on the drawings.

Figure 1:
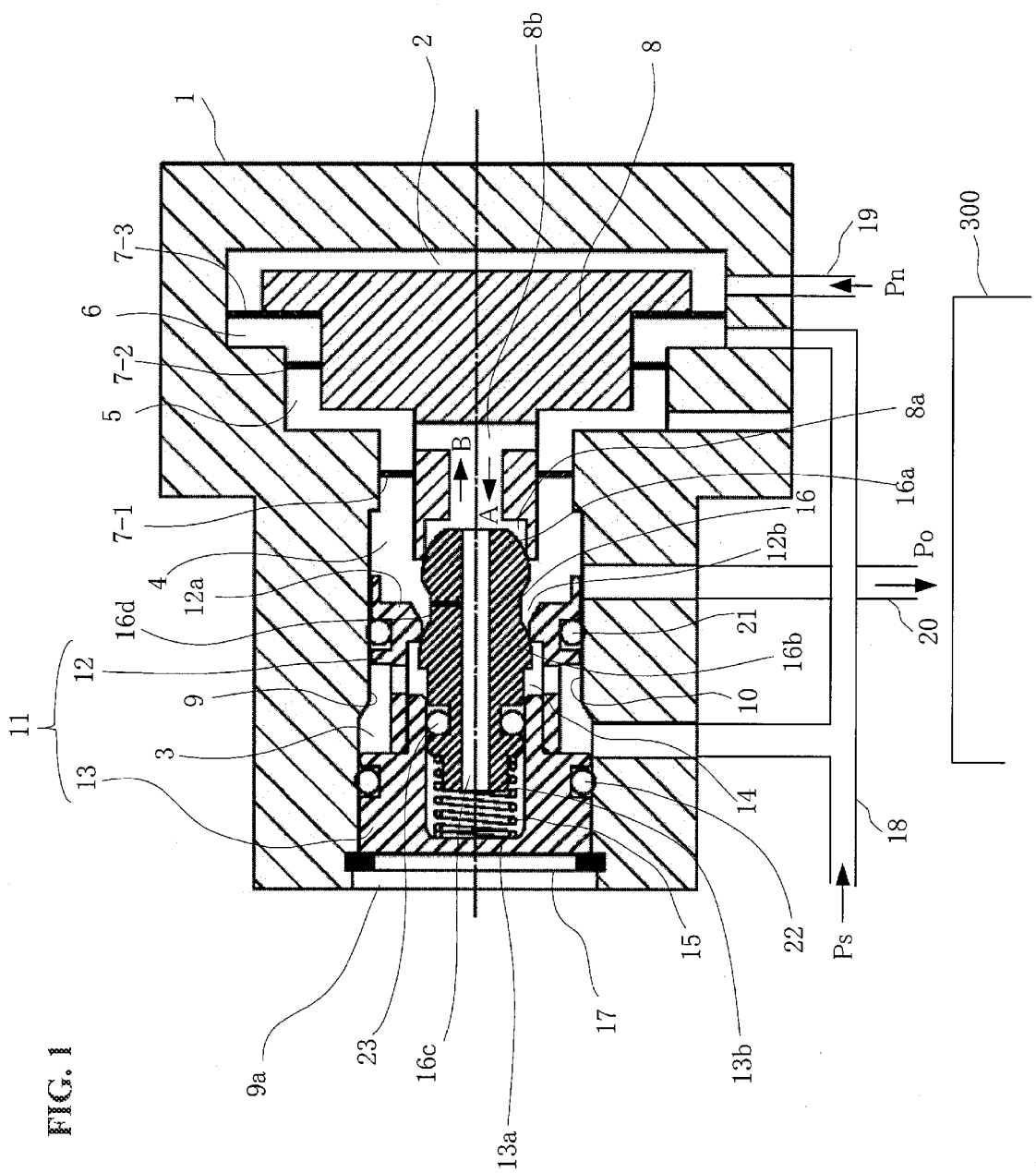
FIG. 1 is a diagram illustrating a structure of an example of a pilot relay (a single-action pilot relay) according to the present invention.

FIG. 1 is a diagram illustrating the structure of an example of a pilot relay according to the present invention. This pilot relay is of the single-action type. In this figure, 1 is a housing, where an input air pressure chamber 2, a supply air pressure chamber 3, an output air pressure chamber 4, a discharge air chamber 5, and a bias chamber 6 are provided within the housing 1.

In this housing 1, the discharge air chamber 5 is adjacent to the output air pressure chamber 4 with a first diaphragm 7-1 interposed therebetween, and adjacent to the bias chamber 6 with a second diaphragm 7-2 interposed therebetween. Moreover, the input air pressure chamber 2 is adjacent to the bias chamber 6 with a third diaphragm 7-3 interposed therebetween. The first through third diaphragms 7-1 through 7-3 are provided between the housing 1 and a spool (movable body) 8, where the spool 8 is supported by these first through third diaphragms 7-1 through 7-3 so as to be able to move in the direction of the arrow A and in the direction of the arrow B.

The spool 8 has an opening 8a that is located at the output air pressure chamber 4, and a discharge air duct 8b that connects the opening 8a to the discharge air chamber 5. A duct 9, having an opening portion 9a that opens to the outside of the housing 1, is provided in the housing 1 as a poppet valve assembly installing portion 10. A poppet valve assembly 11 is installed slidably, along the inside wall face of the duct 9, from the opening portion 9a of the duct 9 that faces the outside of the housing 1, into the poppet valve assembly installing portion 10, where the space remaining at the bottom portion of the duct 9 is defined as the output air pressure chamber 4.

The poppet valve assembly 11 is a divided structure of a cylindrical pipe seat portion 12 and a cylindrical column seat retaining portion 13, having the seat portion 12 attached removably to the front face thereof, where an interior space 14 is formed between the seat portion 12 and the seat retaining portion 13. A connecting hole 12b for connecting between the interior space 14 and the output air pressure chamber 4 is formed in the top face 12a of the seat portion 12. This top face 12a of the seat portion 12 fulfills the role as a dividing wall for partitioning between the supply air pressure chamber 3 and the output air pressure chamber 4.

A spring 15 is contained in the interior space 14 between the seat portion 12 and the seat retaining portion 13, where the poppet valve 16 is held between the seat portion 12 and the seat retaining portion 13 in a state wherein the spring 15 is stressed. The interior space 14 is connected to the supply air pressure chamber 3. The poppet valve 16 has a discharge air valve 16a at the tip end portion thereof, and a supply air valve 16b to the rear of the discharge air valve 16a. Moreover, the poppet valve 16 has a through hole 16c that passes through the axis thereof.

In this held state, the poppet valve 16 penetrates through the connecting hole 12b that is formed in the seat portion 12 and is biased by the spring 15 so as to be able to move to the left and right. Moreover, the supply air valve 16b is biased in the direction so as to close the connecting hole 12b, and the discharge air valve 16a protrudes from the connecting hole 12b. Note that a fine connecting duct (a bleed hole) 16d that connects to the through hole 16c that is formed on the interior of the poppet valve 16 is formed between the discharge air valve 16a and the supply air valve 16b of the poppet valve 16. Because in this poppet valve assembly 11 the seat portion 12 and the seat retaining portion 13 have a divided structure, the assembly operation for the spring 15 and the poppet valve 16 is easy.

After attaching this poppet valve assembly 11 to the poppet valve assembly installing portion 10, that is, after the poppet valve assembly 11 is pushed into the duct 9 from the opening portion 9a that faces the outside of the housing 1, in relation to this poppet valve assembly 11, a ring-shaped stopper plate 17 is attached to the opening portion 9a of the duct 9. That is, the ring surface of the stopper plate 17 is put into facial contact with the surface of the poppet valve assembly 11 that faces the outside of the housing 1 (the bottom face 13a of the seat retaining portion 13), to control the location of the poppet valve assembly 11 in the poppet valve assembly installing portion 10.

In this single-action pilot relay, the supply air pressure Ps is supplied through the air supplying pipe 18 to the supply air pressure chamber 3 and the bias chamber 6, and the input air pressure Pn is guided through the nozzle back pressure injecting pipe 19 into the input air pressure chamber 2. Moreover, the output air pressure Po is outputted to the valve 300 from the output air pressure chamber 4 through an air outputting pipe 20.

Note that the discharge air chamber 5 is connected to atmosphere, and O-rings 21 and 22 are provided between the housing 1 and the seat portion 12 and the seat retaining portion 13 of the poppet valve assembly 11. Moreover, in the poppet valve assembly 11, an O-ring 23 is attached between the poppet valve 16 and the seat retaining portion 13. The chamber 13b that contains the spring 15 in the seat retaining portion 13 is separated from the supply air pressure chamber 2 by the O-ring 23, and is one chamber that is connected to the through hole 16c of the poppet valve 16.

In this single-action pilot relay, when the input air pressure Pn is increased, the diaphragms 7-1 through 7-3 move to the side of the arrow A, and, concomitant therewith, the spool 8 that is supported on the diaphragms 7-1 through 7-3 moves to the side of the arrow A. At this time, the spool 8, through this movement, presses the poppet valve 16 downward against the biasing force of the spring 15, and, as a result, the supply air valve 16b of the poppet valve 16 opens the connecting hole 12b. At this time, the opening 8a of the spool 8 is closed by the discharge air valve 16a of the poppet valve 16. As a result, the air that is supplied to the supply air pressure chamber 3 through the air supplying pipe 18 is introduced into the output air pressure chamber 4 through the connecting hole 12b, to be supplied to the valve 300 through the air outputting pipe 20.

On the other hand, when the input air pressure Pn is decreased, the diaphragms 7-1 through 7-3 move to the side of the arrow B, and, concomitantly, the spool 8 that is supported on the diaphragms 7-1 through 7-3 moves to the side of the arrow B. At this point, the poppet valve 16 is pushed upward by the biasing force of the spring 15, and, accordingly, the supply air valve 16b of the poppet valve 16 closes the connecting hole 12b. At this time, the opening 8a of the spool 8 is opened by the discharge air valve 16a of the poppet valve 16. As a result, the air within the output air pressure chamber 4 enters into the discharge air duct 8b through the opening 8a of the spool 8, to be discharged to the discharge air chamber 5.

In this way, the spool 8 and the poppet valve 16 are actuated by the input air pressure Pn that is directed into the input air pressure chamber 2, where the action thereof causes the amplified output air pressure Po to be outputted to the valve 300 through the air outputting pipe 20. In this case, the output air pressure Po can be adjusted through adjusting the pressure of the input air pressure Pn.

Note that the fine connecting duct 16d that is formed in the poppet valve 16 fulfills the role of causing the connecting hole 12b to be blocked (sealing the supply air port) quickly by the supply air valve 16b of the poppet valve 16 by causing the air of the output air pressure chamber 4 to pass through the through hole 16c that is formed in the poppet valve 16, to be directed towards the discharge air duct 8b of the spool 8, to flow out to the discharge air chamber 5, to be directed into the chamber 13b of the seat retaining portion 13, wherein the spring 15 is contained, when the supply air valve 16b of the poppet valve 16 is to close the connecting hole 12b. The roles of the fine connecting duct 16d, the through hole 16c, and the chamber 13b is explained in detail also in the section on ameliorating the non-linear characteristics of the supply of air and discharge of air due to the dead band.

Figure 2:
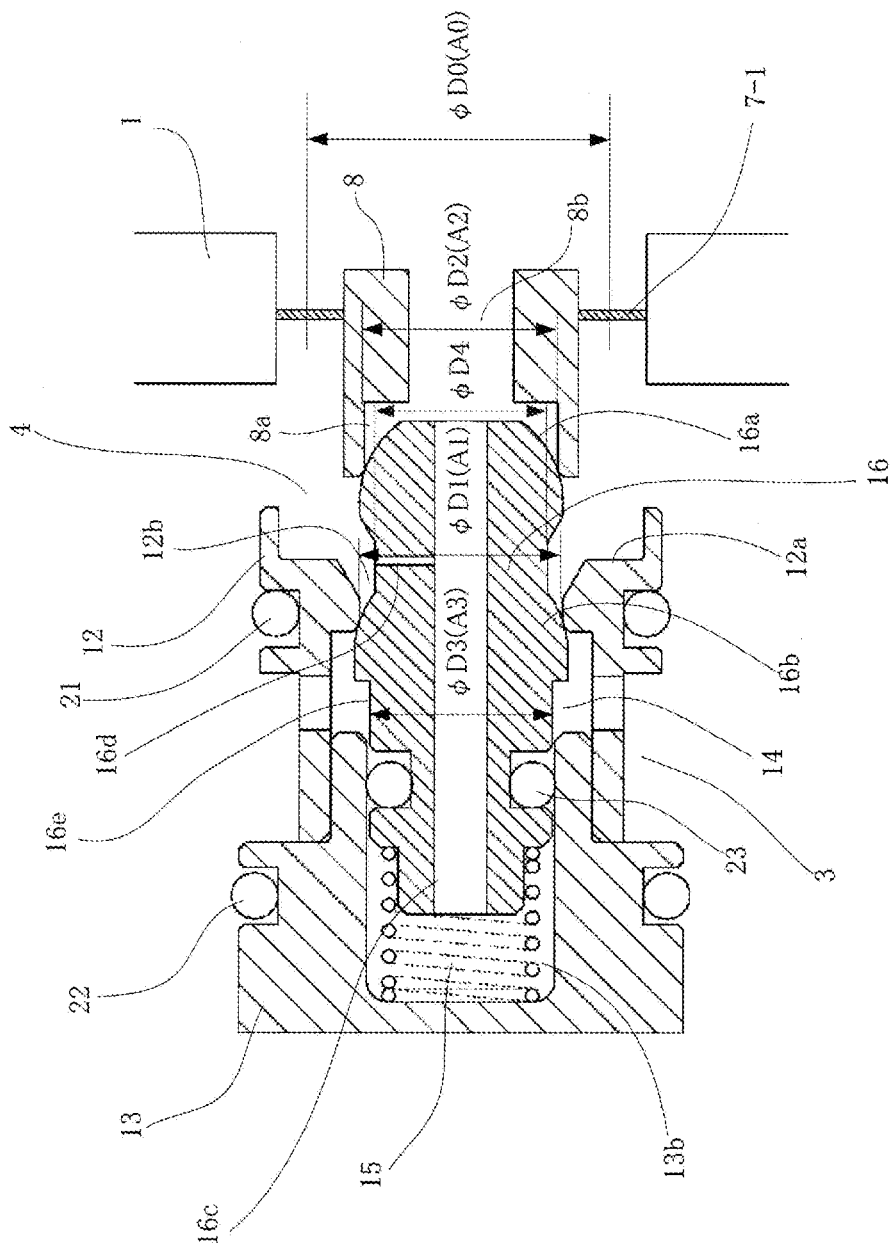
FIG. 2 is a diagram illustrating an enlargement of the surrounding of a poppet valve in this single-action pilot relay.

FIG. 2 shows an enlargement of the area around the poppet valve 16. In this single-action pilot relay, the poppet valve 16 has an outer peripheral surface 16e on the supply air pressure chamber 3 side, connecting to the supply air valve 16b, as a guide portion for guiding the movement of the poppet valve 16. Moreover, with the effective diameter of the diaphragm 7-1 as $\phi D0$, the diameter of the connecting hole 12b as $\phi D1$, the diameter of the opening 8a of the spool 8 as $\phi D2$, and the diameter of the guide portion 16e as $\phi D3$, and with the effective surface area of the diaphragm 7-1 as A0, the cross-sectional area of the connecting hole 12b as A1, the cross-sectional area of the opening 8a of the spool 8 as the A2, and the cross-sectional area of the guide portion 16e as A3, the relationships of these areas A0, A1, A2, and A3 are set as A0>A1>A2>A3.

Moreover, the diameter $\phi D1$ of the connecting hole 12b that is opened and closed by the supply air valve 16b of the poppet valve 16 is made large, and the difference between the diameter $\phi D1$ of this connecting hole 12b and the effective diameter $\phi D0$ of the diaphragm 7-1 is made small. Doing so causes the difference between the effective surface area A0 of the diaphragm 7-1 and the cross-sectional area A1 of the connecting hole 12b to be small, so that in the equation that expresses the gain of the pilot relay, expressed as G=An/Ao, the effective surface area Ao that bears the output air pressure Po can be small, thus making it possible to increase the gain while leaving the effective surface area An that bears the input air pressure Pn as-is.

Figure 3:
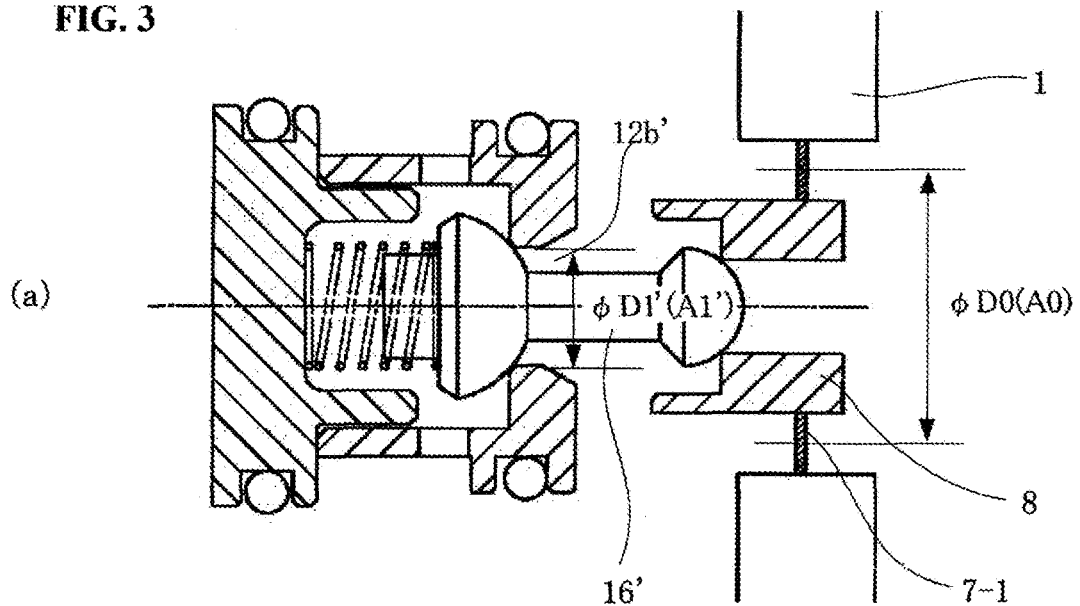
FIGS. 3(a) and 3(b) are diagrams illustrating a comparison of the surrounding of a poppet valve in this single-action pilot relay with a conventional structure.
Figure 3:
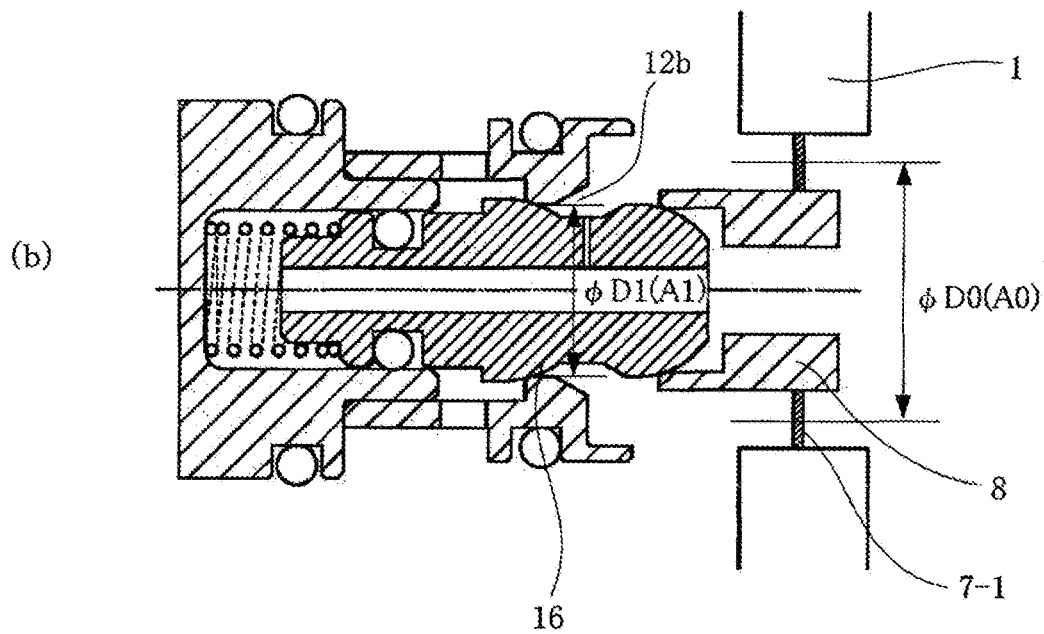

FIG. 3 shows a comparison between the structure around the poppet valve and the structure currently used by the applicant (the conventional structure). FIG. 3(a) is the conventional structure, where, in this conventional structure, the diameter φD1' of the connecting hole 12b' that is opened and closed by the poppet valve 16' is substantially smaller than the diameter φD1 of the connecting hole 12b in the structure in the present example, illustrated in FIG. 3(b) (that is, φD1>φD1'). For example, for a φD0 of about 12 mm, φD1 of the connecting hole 12b in the structure in the present application would be about 8 mm, where φD1' of the connecting hole 12b' in the conventional structure is about 4 mm.

Here the pressure bearing surface area for bearing the output air pressure Po, in the structure in the present application, is expressed as $Ao = A0 - A1 = (\pi/4) \times ((D0)^2 - (D1)^2)$, where, in the conventional structure, $Ao' = A0 - A1' = (\pi/4) \times ((D0)^2 - (D1')^2)$. Moreover, if the pressure bearing area An of the input air pressure chamber 2 is the same, then the gains are expressed respectively as $G = An/Ao$ for the structure in the present application and $G' = An'/Ao'$ for the conventional structure, where $Ao < Ao'$, and thus $G > G'$. Consequently, in comparison with the conventional structure, the gain in the structure according to the present example is higher.

Moreover, the relationship between the diameter φD1 (the cross-sectional area A1) of the connecting hole 12b and the diameter φD2 (the cross-sectional area A2) of the opening 8a of the spool 8 is φD1>φD2 (A1>A2). In this case, when the diameter φD1 of the connecting hole 12b (the supply air port diameter) and the diameter φD2 of the opening 8a of the spool 8 (the discharge port diameter) are made to be as close as possible, the poppet valve 16, at the time of supplying or discharging air, is easily stabilized.

Moreover, in the structure in the examples of the present application, the relationship between the diameter φD2 of the opening 8a of the spool 8 (the cross-sectional area A2) and the diameter φD3 of the guide portion 16e (the cross-sectional area A3) is φD2>φD3 (A2>A3). As a result, it is possible to ensure the self-sealing of the supply air port, even when the output air pressure Po is at the supply air pressure Ps.

FIG. 2 illustrates the situation in the vicinity of the poppet valve when in the discharge mode. At this time, the forces acting on the poppet valve 16 are as follows:

(1) Poppet valve discharge side peripheral edge (Po): $F1 = (\pi/4) \times ((D2)^2 - (D4)^2) \times Po$ (2) Poppet valve supply air side peripheral edge (Po): $F2 = -(\pi/4) \times ((D1)^2 - (D4)^2) \times Po$ (3) Poppet valve supply air side peripheral edge (Ps): $F3 = -(\pi/4) \times ((D1)^2 - (D3)^2) \times Ps$ (4) Poppet valve retaining spring force: f Given the above, the condition for self-sealing of the supply air port is expressed by:

$$F = F1 + F2 + F3 f = (\pi/4) \times ((D2)^2 - (D1)^2) \times Po + (\pi/4) \times ((D3)^2 - (D3)^2) \times Ps + f > 0 \quad (1)$$

In this Equation (1), the most difficult condition is when Po=Ps. In consideration of this, Equation (1), above, can be expressed by Equation (2), below:

$$F = (\pi/4) \times ((D2)^2 - (D3)^2) \times Ps + f > 0 \quad (2)$$

The satisfaction of this Equation (2) is the requirement for self-sealing of the supply air port.

Consequently, defining φD2>φD3 (A2>A3), and making the term $(\pi/4) \times ((D2) - (D3)^2) \times Ps$ in the aforementioned Equation (2) makes it possible to ensure self-sealing of the supply air port even when the output air pressure Po is equal to the supply air pressure Ps.

Moreover, as illustrated in FIG. 1, in this single-action pilot relay, the output air pressure chamber 4 is adjacent to the discharge air chamber 5 with the first diaphragm 7-1 therebetween, the discharge air chamber 5 is adjacent to the bias chamber 6 with the second diaphragm 7-2 therebetween, and the bias chamber 6 is adjacent to the input air pressure chamber 2 with the third diaphragm 7-3 therebetween.

As can be understood from such an arrangement of the chambers, in this single-action pilot relay, the bias chamber 6 and the discharge air chamber 5 are provided between the input air pressure chamber 2 and the output air pressure chamber 4, so that the input air pressure chamber 2 and the output air pressure chamber 4 are not adjacent to each other, so there is no diaphragm, among the diaphragms 7-1 through 7-3, wherein there is a sudden change of sign of the pressure. Because of this, the durability of the diaphragm is improved when compared to a structure wherein the input air pressure chamber 2 and the output air pressure chamber 4 are adjacent to each other and wherein a diaphragm is provided therebetween.

Figure 4:
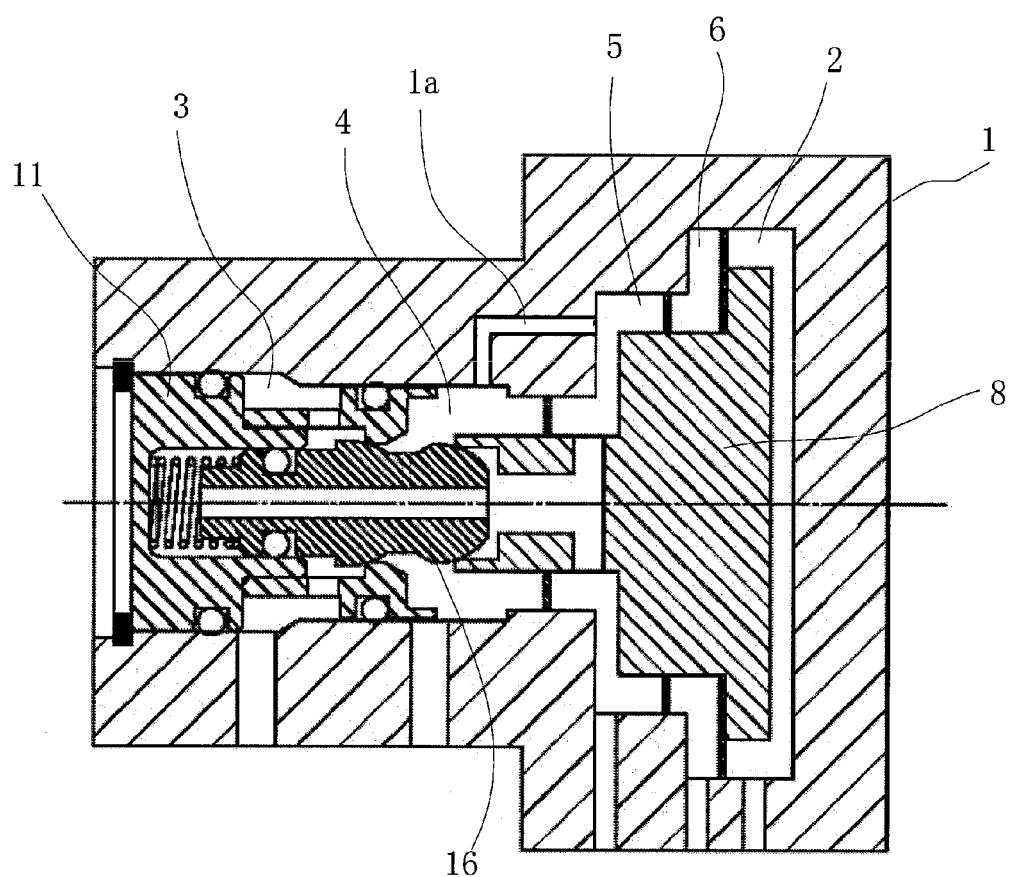
FIG. 4 is a diagram illustrating an example wherein a fine connecting duct (a bleed hole) for connecting the output air pressure chamber and the discharge air chamber is provided in the housing in this single-action pilot relay.
Figure 5:
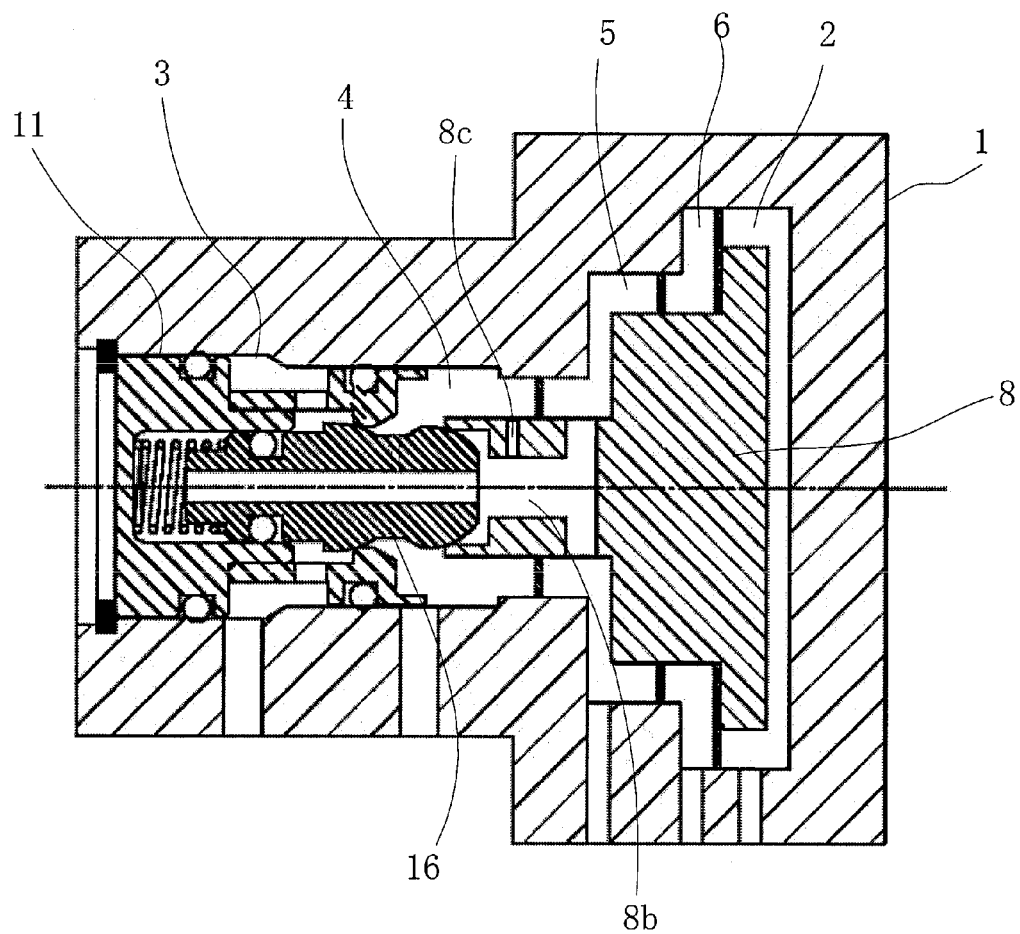
FIG. 5 is a diagram illustrating an example wherein a fine connecting duct for connecting the output air pressure chamber and the discharge air chamber is provided in a spool in this single-action pilot relay.
Figure 6:
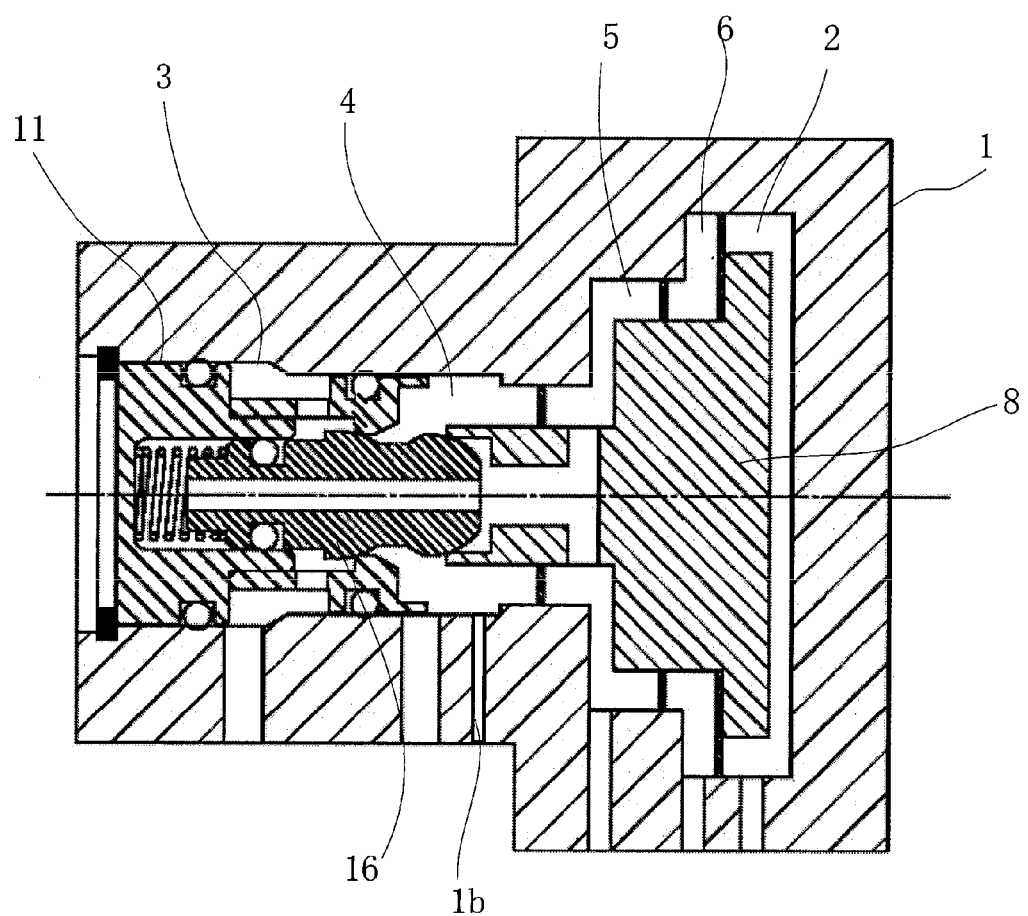
FIG. 6 is a diagram illustrating an example wherein a fine connecting duct for connecting directly the output air pressure chamber and atmosphere is provided in the housing in this single-action pilot relay.

Note that while in the present example a fine connecting duct 16d is provided in the poppet valve 16, instead, as illustrated in FIG. 4, a fine connecting duct 1a may be formed in the housing 1, to connect between the output air pressure chamber 4 and the discharge air chamber 5. Conversely, as illustrated in FIG. 5, a fine connecting duct 8c may be formed in the spool 8, and the output air pressure chamber 4 and the discharge air chamber 5 may be connected through a discharge air duct 8b. Moreover, as illustrated in FIG. 6, a fine connecting duct 1b for connecting the output air pressure chamber 4 directly to atmosphere, may be formed in the housing 1. In the present example, the fine connecting duct 16d is provided in the poppet valve 16, and thus maintenance of the fine connecting duct 16d is also easy, without having to touch the housing 1 or spool 8.

Figure 7:
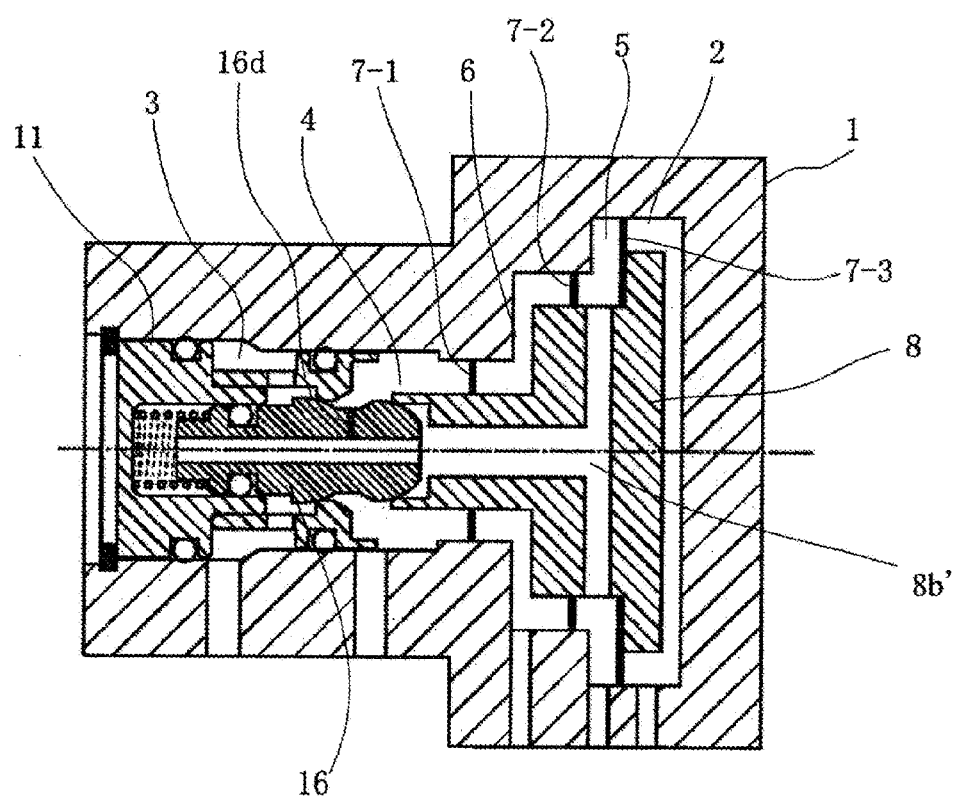
FIG. 7 is a diagram illustrating an example wherein a bias chamber is provided between the output air pressure chamber and the discharge air chamber in this single-action pilot relay.

Moreover, while in the present example a bias chamber 6 is provided between the input air pressure chamber 2 and the discharge air chamber 5, the bias chamber 6 may instead be provided between the output air pressure chamber 4 and the discharge air chamber 5. FIG. 7 shows an example of the provision of the bias chamber 6 between the output air pressure chamber 4 and the discharge air chamber 5. In this example, the bias chamber 6 is adjacent to the output air pressure chamber 4, with the first diaphragm 7-1 therebetween, and adjacent to the discharge air chamber 5,with the second diaphragm 7-2 therebetween. Moreover, the input air pressure chamber 2 is adjacent to the discharge air chamber 5, with the third diaphragm 7-3 therebetween. Note that in this case, the discharge air duct 8b' of the spool 8 extends to the back of the spool 8, and is open to the discharge air chamber 5 at a position that is to the rear of the bias chamber 6.

In the present example, the fine connecting duct 16d that is formed in the poppet valve 16 fulfills the role of increasing the speed with which the supply air port is closed. The differential pressure between the supply air pressure Ps and the output air pressure Po, and a force determined by the diameter of the supply air port act on the supply air valve 16b of the poppet valve 16, where these forces are the cause of a dead band, wherein there is no switching between supplying and discharging air relative to a change in the input air pressure Pn. In order to ameliorate the non-linearity of the supply air and discharge air caused by this dead band, a fine connecting duct 16d is formed in the poppet valve 16 to enable the output air pressure Po to escape to atmosphere.

The force Fv that acts on the poppet valve 16 due to the supply air pressure Ps has an effect on the dead band (the insensitive band) of the pilot relay. Moreover, in the settling of the poppet valve 16 due to the pressure balance after an air discharge operation, it is necessary to balance this force Fv with the amount of reduction ΔPo of the output air pressure Po through the fine connecting duct 16*d*.

That is, making Fv as small as possible while securing the force to close the supply air port by the poppet valve 16 makes it possible to reduce the dead band, and to reduce ΔPo. That is, it is possible to cause the poppet valve 16 to settle in a shorter time.

To do this, in the present example a chamber 13*b* is provided, and sealed with an O-ring 23, where this chamber 13*b* is vented to atmospheric pressure through a through hole 16*c* that is provided passing through the axis of the poppet valve 16, in order to cancel the supply air pressure Ps on the supply air valve side of the poppet valve 16. Moreover, because, in practice, there is the need for a shut-up force on the supply air valve 16*b*, it is held through the application of some degree of differential pressure, or through a slight biasing force of the spring 15. Given this structure, the force Fv that acts on the poppet valve 16 is reduced substantially, reducing the dead band, and reducing ΔPo, thereby.

Figure 8:
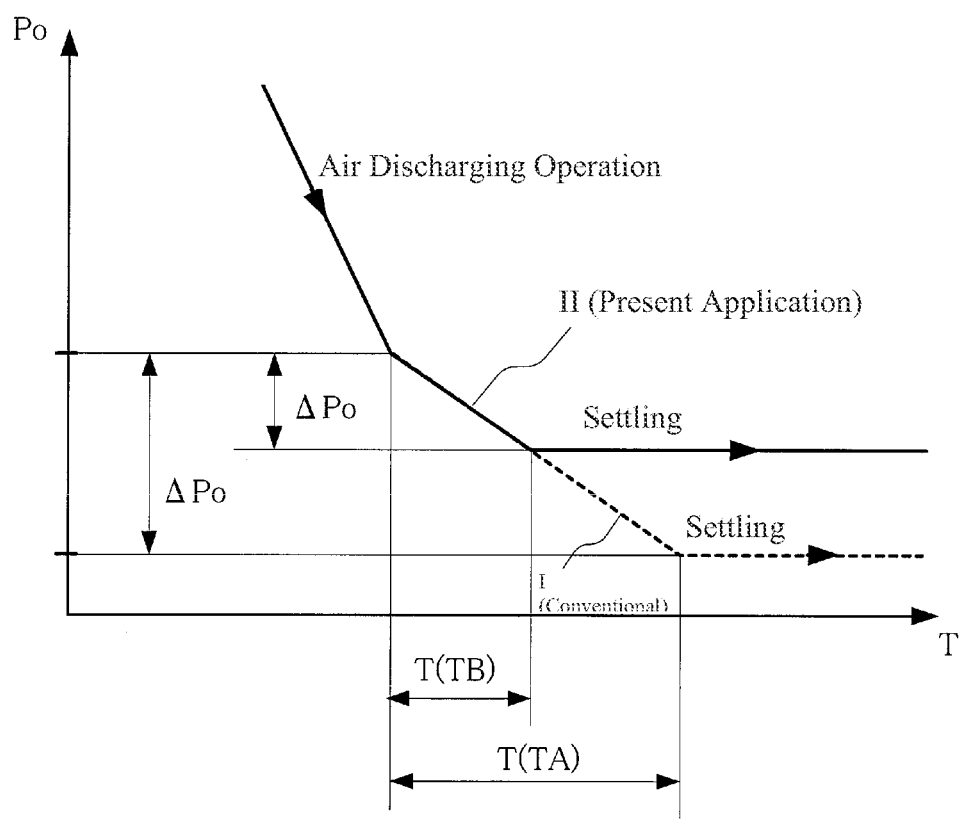
FIG. 8 is a diagram for explaining a comparison of the structure of an example and the conventional structure regarding the settling time for a poppet valve in this single-action pilot relay, where the bleed hole diameters are the same.

The settling time for the poppet valve 16 is explained using FIG. 8. In the case wherein the chamber 13*b* for canceling out the supply air pressure Ps is not provided (the conventional structure), ΔPo is large, as in Curve I that is illustrated by the dotted line in the figure, so the time T (TA) required for the settling of the poppet valve 16 is long. In contrast, when the chamber 13*b* for canceling out the supply air pressure Ps is provided (e.g., the structure in the present example), the ΔPo is shortened as in Curve II that is illustrated by the solid line in the figure, shortening the time T (TB) required for the poppet valve 16 to settle.

Note that in this case the conventional structure is a structure wherein, for example, a fine connecting duct (a bleed hole) in FIG. 3 is provided in the spool 8, or the like, and the diameter of the bleed hole is the same in both the conventional structure and the structure in the present example. As can be seen in this comparison, the use of the structure according to the present example speeds up the settling of the output air pressure without increasing the bleed rate.

Figure 9:
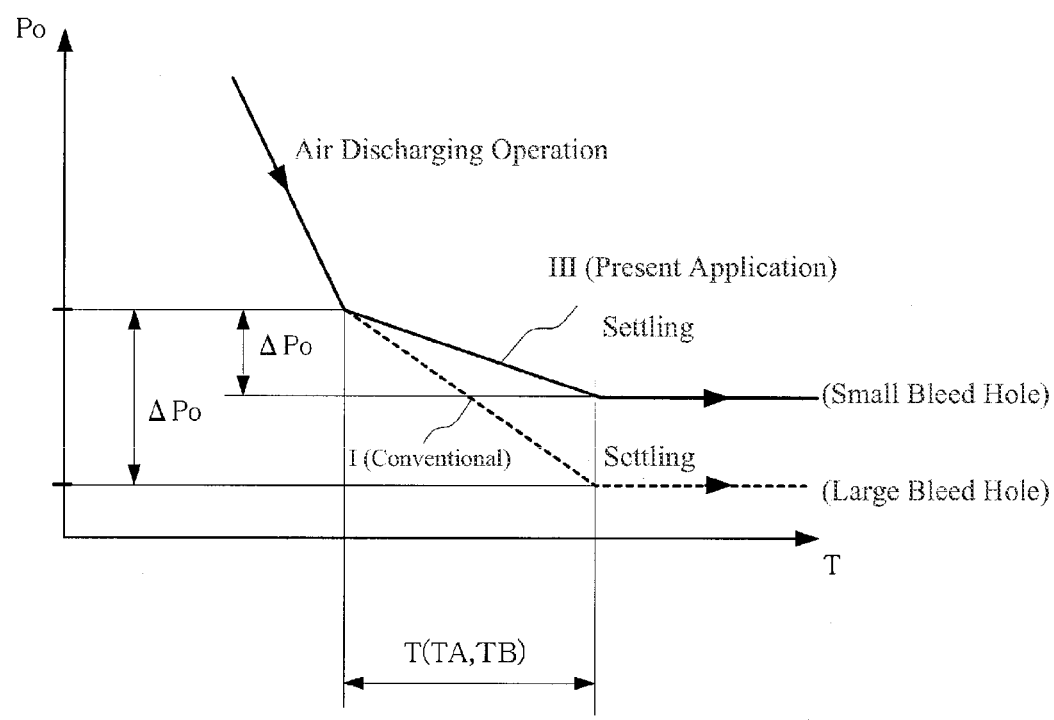
FIG. 9 is a diagram for explaining a comparison of the structure of an example of the present application and the conventional structure regarding the settling time for a poppet valve in this single-action pilot relay with small bleed hole diameters.

If, at this point, identical times are allowed for the time T required for settling (that is, TA=TB), then, in the structure according to the present invention it is possible to further reduce the diameter of the fine connecting duct (the bleed hole) 16*d* (referencing Curve III shown in FIG. 9). In this case, the amount of reduction of the diameter of the fine connecting duct 16*d* is the amount of reduction in the steady-state air consumption rate of the pilot relay as-is. For example, if the diameter of the fine connecting duct 16*d* is set to between 0.2 and 0.25 mm, then it is possible to reduce the steady-state air consumption rate of the pilot relay by between 30 and 50%.

In this example, the comparison is performed with the same settling time T for both the conventional structure and the structure according to the present example; however, it is possible to increase the speed of settling of the output air pressure even when reducing the bleed rate. That is, the structure according to the present application makes it possible to reduce the diameter of the fine connecting duct 16*d* to reduce the steady-state air consumption rate.

Figure 10:
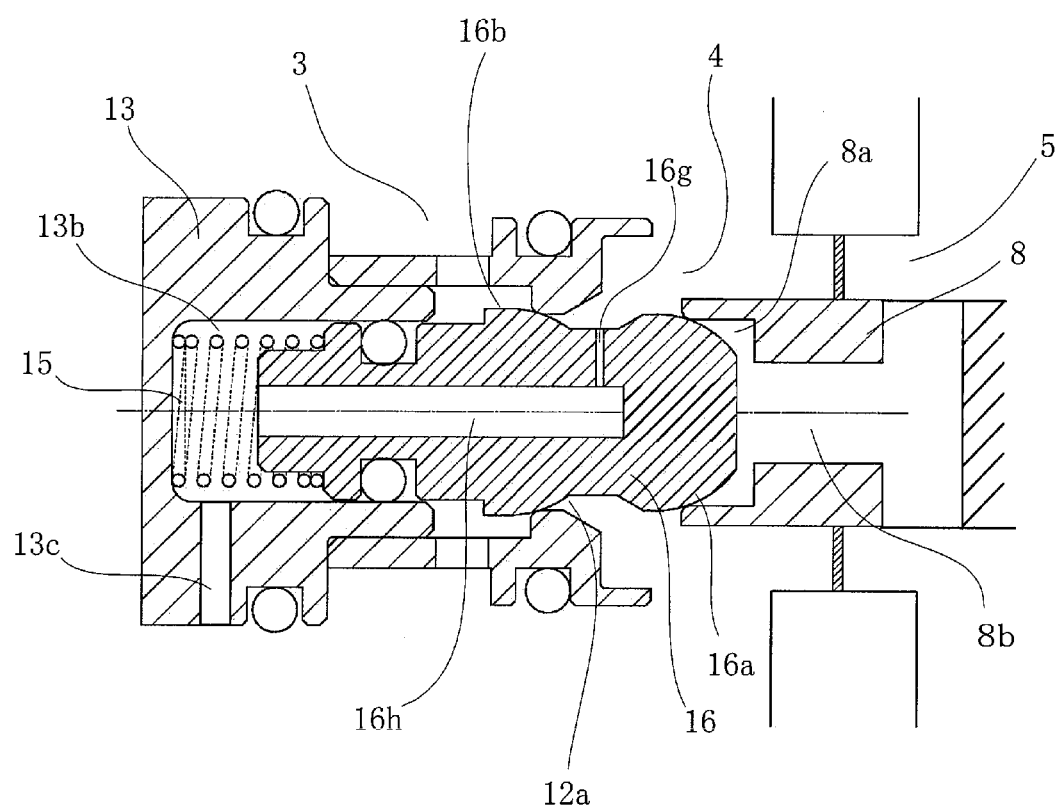
FIG. 10 is a diagram illustrating an example wherein a fine connecting duct is provided for connecting the output air pressure chamber and a chamber wherein a spring is contained, in a poppet valve.

Note that, as illustrated in FIG. 10, a connecting duct may be provided for connecting the output air pressure chamber 4 and the chamber 13*b* that contains the spring 15 in the poppet valve 16. In this example, a fine connecting duct 16*g* that opens to the output air pressure chamber 4 is provided in the poppet valve 16, a non-through hole 16*h* that is open on the side of the chamber 13*b* that contains the spring 15 is provided in the poppet valve 16, and a connecting duct is formed to connect the non-through hole 16*h* and the fine connecting duct 16*g*.

In this case, the chamber 13*b* that contains the spring 15 goes to atmospheric pressure, and thus the force that acts on the poppet valve 16 due to the supply air pressure can be substantially reduced while maintaining the force to close the supply air port by the poppet valve 16. The dead band, and the amount of pressure reduction ΔPo in the output air pressure due to the fine connecting duct 16*g* are reduced thereby, making it possible to increase the speed of settling of the output air pressure without increasing the bleed rate. This also makes it possible to reduce the steady-state air consumption rate by reducing the diameter of the fine connecting duct 16*g*.

Figure 11:
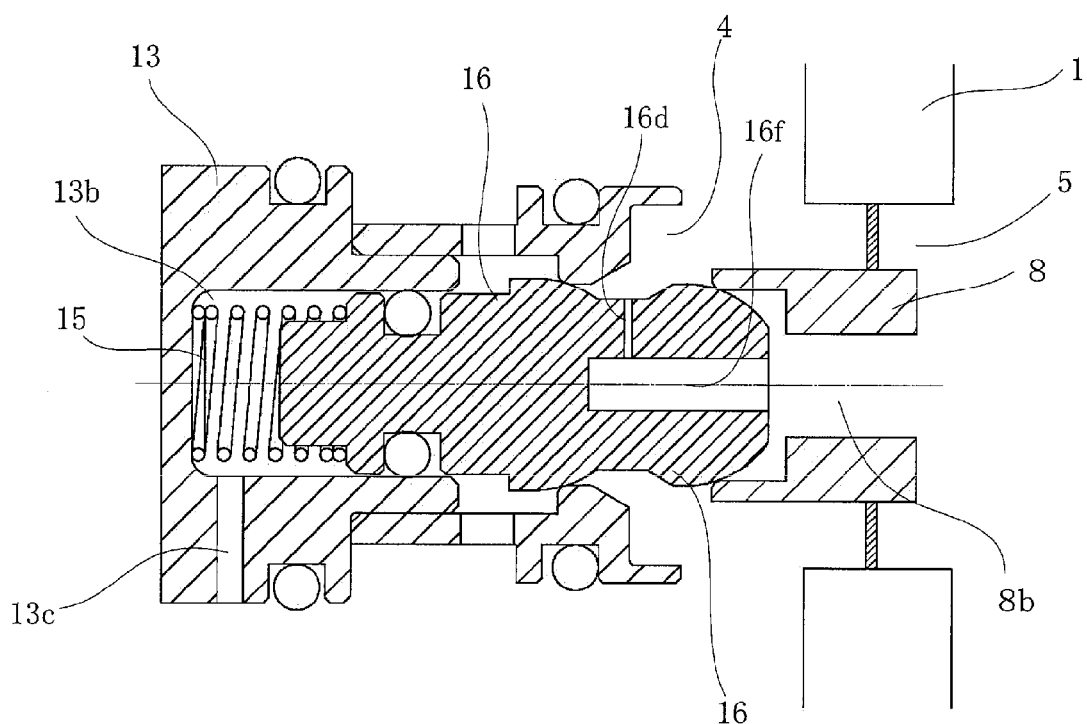
FIG. 11 is a diagram illustrating an example wherein a connecting duct is provided for connecting the chamber wherein the spring is contained to atmosphere are provided in a seat retaining portion.

Moreover, as illustrated in FIG. 11, a connecting duct may be provided for connecting the output air pressure chamber 4 and the discharge air chamber 5 in the poppet valve 16. In this example, a fine connecting duct 16*d* that opens into the output air pressure chamber 4 is provided in the poppet valve 16, and a non-through hole 16*f* that opens to the discharge air chamber 5 is provided in the poppet valve 16, where a connecting duct is formed to connect the non-through hole 16*f* and the fine connecting duct 16*d*.

In this case, the discharge air chamber 5 will go to atmospheric pressure, and thus the force that acts on the poppet valve 16 due to the supply air pressure can be substantially reduced while maintaining the force to close the supply air port by the poppet valve 16. The dead band, and the amount of pressure reduction ΔPo in the output air pressure due to the fine connecting duct 16*d* are reduced thereby, making it possible to increase the speed of settling of the output air pressure without increasing the bleed rate. This also makes it possible to reduce the steady-state air consumption rate by reducing the diameter of the fine connecting duct 16*d*.

Figure 12:
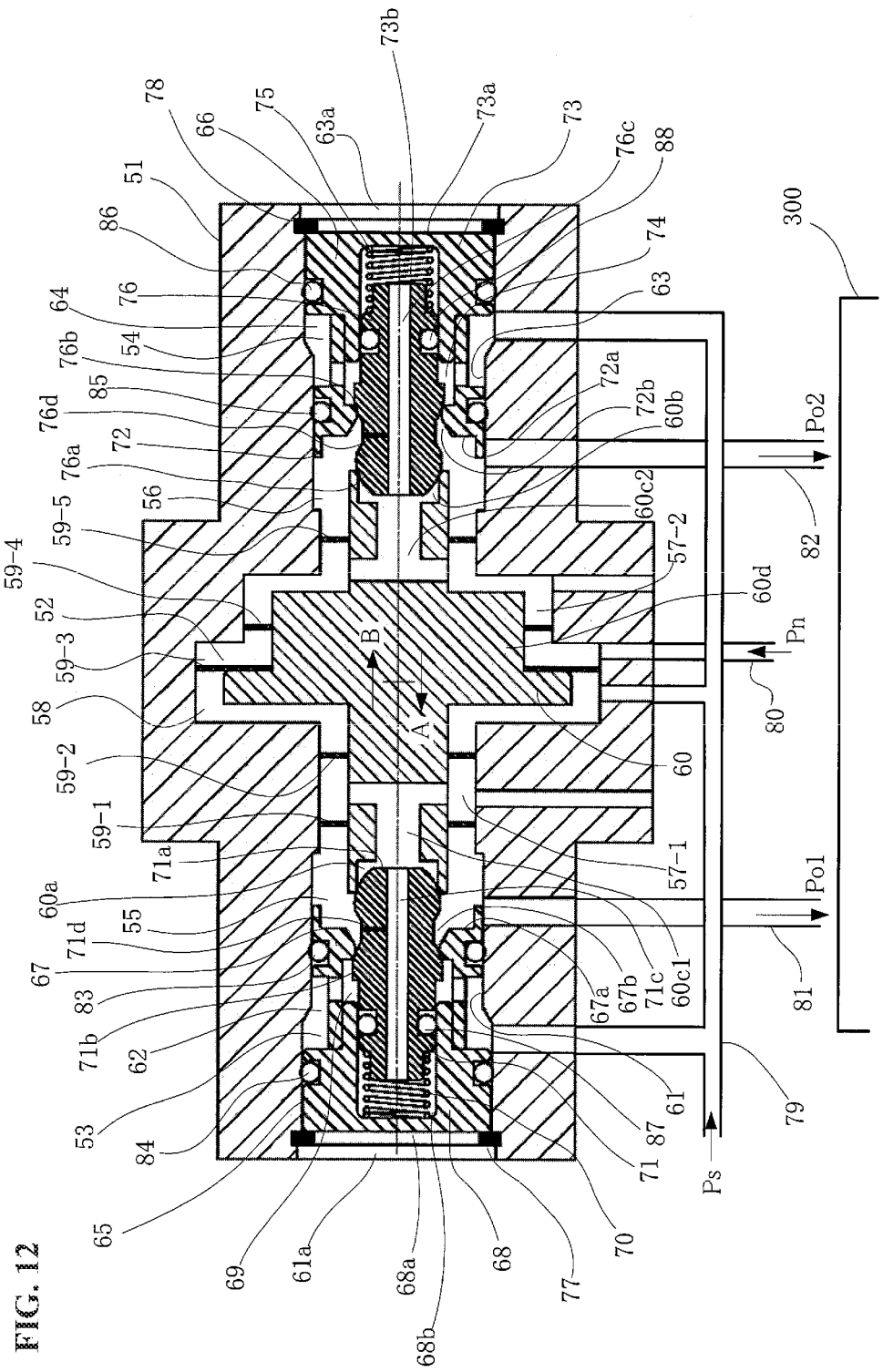
FIG. 12 is a diagram illustrating a structure of another example of a pilot relay, a double-action pilot relay, according to the present invention.

FIG. 12 is a diagram illustrating the structure of another example of a pilot relay according to the present invention. This pilot relay is of the double-action type. In this figure, 51 is a housing, where an input air pressure chamber 52, a first supply air pressure chamber 53, a second supply air pressure chamber 54, a first output air pressure chamber 55, a second output air pressure chamber 56, a first discharge air chamber 57-1, a second discharge air chamber 57-2, and a bias chamber 58 are provided within the housing 51.

In this housing 51, the first discharge air chamber 57-1 is adjacent to the first output air pressure chamber 55 with a first diaphragm 59-1 interposed therebetween, and adjacent to the bias chamber 58 with a second diaphragm 59-2 interposed therebetween. Moreover, the input air pressure chamber 52 is adjacent to the bias chamber 58 with a third diaphragm 59-3 interposed therebetween, and adjacent to a second discharge air chamber 57-2 with a fourth diaphragm 59-4 interposed therebetween. Moreover, the second discharge air chamber 57-2 is adjacent to the second output air pressure chamber 56 with a fifth diaphragm 59-5 interposed therebetween. The first through fifth diaphragms 59-1 through 59-5 are provided between the housing 51 and a spool (movable body) 60, where the spool 60 is supported by these first through fifth diaphragms 59-1 through 59-5 so as to be able to move in the direction of the arrow A and in the direction of the arrow B.

The spool 60 has a first opening 60*a* that is located at the first output air pressure chamber 55, a second opening 60*b* that is located at the second output air pressure chamber 56, a first discharge air duct 60*c*1 for connecting a first opening 60*a* to the first discharge air chamber 57-1, and a second discharge air duct 60*c*2 for connecting a second opening 60*b* to the second discharge air chamber 57-2. In the spool 60, the first discharge air duct 60c1 and the second discharge air duct 60c2 are divided by a non-duct portion 60d.

Moreover, at the end portion on one side of the housing 51, a duct 61 wherein the opening portion 61a thereof faces the outside of the housing 51 is provided as a first poppet valve assembly installing portion 62, and at the end portion on the other side of the housing 51, a duct 63 wherein the opening portion 63a thereof faces the outside of the housing 51 is provided as a second poppet valve assembly installing portion 64.

A first poppet valve assembly 65 is installed slidably, along the inside wall face of the duct 61, from the opening portion 61a of the duct 61 that faces the outside of the housing 51, into the first poppet valve assembly installing portion 62, where the space remaining at the bottom portion of the duct 61 is defined as the first output air pressure chamber 55. A second poppet valve assembly 66 is installed slidably, along the inside wall face of the duct 63, from the opening portion 63a of the duct 63 that faces the outside of the housing 51, into the second poppet valve assembly installing portion 64, where the space remaining at the bottom portion of the duct 63 is defined as the second output air pressure chamber 56.

The first poppet valve assembly 65 is a divided structure of a cylindrical pipe seat portion 67 and a cylindrical column seat retaining portion 68, having the seat portion 67 attached removably to the front face thereof, where an interior space 69 is formed between the seat portion 67 and the seat retaining portion 68. A first connecting hole 67b for connecting between the interior space 69 and the first output air pressure chamber 55 is formed in the top face 67a of the seat portion 67. This top face 67a of the seat portion 67 fulfills the role as a first dividing wall for partitioning between the first supply air pressure chamber 53 and the first output air pressure chamber 55.

A first spring 70 is contained in the interior space 69 between the seat portion 67 and the seat retaining portion 68, where the first poppet valve 71 is held between the seat portion 67 and the seat retaining portion 68 in a state wherein the first spring 70 is stressed. The interior space 69 is connected to the first supply air pressure chamber 53. The first poppet valve 71 has a discharge air valve 71a at the tip end portion thereof, and a supply air valve 71b to the rear of the discharge air valve 71a. Moreover, the first poppet valve 71 has a through hole 71c that passes through the axis thereof.

In this held state, the first poppet valve 71 penetrates through the first connecting hole 67b that is formed in the seat portion 67, and is biased by the first spring 70 so as to be able to move to the left and right. Moreover, the supply air valve 71b is biased in the direction so as to close the first connecting hole 67b, and the discharge air valve 71a protrudes from the first connecting hole 67b. Note that a fine connecting duct 71d that connects to the through hole 71c that is formed on the interior of the first poppet valve 71 is formed between the discharge air valve 71a and the supply air valve 71b of the first poppet valve 71.

The second poppet valve assembly 66 is also structured identically to the first poppet valve assembly 65. That is, the second poppet valve assembly 66 is a divided structure of a cylindrical pipe seat portion 72 and a cylindrical column seat retaining portion 73, having the seat portion 72 attached removably to the front face thereof, where an interior space 74 is formed between the seat portion 72 and the seat retaining portion 73. A second connecting hole 72b for connecting between the interior space 74 and the second output air pressure chamber 56 is formed in the top face 72a of the seat portion 72. This top face 72a of the seat portion 72 fulfills the role as a second dividing wall for partitioning between the second supply air pressure chamber 54 and the second output air pressure chamber 56.

A second spring 75 is contained in the interior space 74 between the seat portion 72 and the seat retaining portion 73, where the second poppet valve 76 is held between the seat portion 72 and the seat retaining portion 73 in a state wherein the second spring 75 is stressed. The interior space 74 is connected to the second supply air pressure chamber 54. The second poppet valve 76 has a discharge air valve 76a at the tip end portion thereof, and a supply air valve 76b to the rear of the discharge air valve 76a. Moreover, the second poppet valve 76 has a through hole 76c that passes through the axis thereof.

In this held state, the second poppet valve 76 penetrates through the second connecting hole 72b that is formed in the seat portion 72, and is biased by the second spring 75 so as to be able to move to the left and right. Moreover, the supply air valve 76b is biased in the direction so as to close the second connecting hole 72b, and the discharge air valve 76a protrudes from the second connecting hole 72b. Note that a fine connecting duct 76d that connects to the through hole 76c that is formed on the interior of the second poppet valve 76 is formed between the discharge air valve 76a and the supply air valve 76b of the second poppet valve 76.

After attaching this first poppet valve assembly 65 to the first poppet valve assembly installing portion 62, a ring-shaped stopper plate 77 is attached to the opening portion 61a of the duct 61 in relation to this first poppet valve assembly 65. That is, the ring surface of the stopper plate 77 is put into facial contact with the surface of the first poppet valve assembly 65 that faces the outside of the housing 51 (the bottom face 68a of the seat retaining portion 68), to control the location of the first poppet valve assembly 65 in the first poppet valve assembly installing portion 62.

After attaching this second poppet valve assembly 66 to the second poppet valve assembly installing portion 64, a ring-shaped stopper plate 78 is attached to the opening portion 63a of the duct 63 in relation to this second poppet valve assembly 66. That is, the ring surface of the stopper plate 78 is put into facial contact with the surface of the second poppet valve assembly 66 that faces the outside of the housing 51 (the bottom face 73a of the seat retaining portion 73), to control the location of the second poppet valve assembly 66 in the second poppet valve assembly installing portion 64.

In this double-action pilot relay, the supply air pressure Ps is supplied through the air supplying pipe 79 to the first supply air pressure chamber 53, the second supply air pressure chamber 54, and the bias chamber 58, and the input air pressure Pn is guided through the nozzle back pressure injecting pipe 80 into the input air pressure chamber 52. Moreover, the output air pressure Po1 is outputted to the valve 300 through the first air outputting pipe 81 from the first output air pressure chamber 55 and the output air pressure Po2 is outputted to the valve 300 through the second air outputting pipe 82 from the second output air pressure chamber 56.

Note that the first discharge air chamber 57-1 and the second discharge air chamber 57-2 are connected to atmosphere, and O-rings 83 and 84 are provided between the housing 51 and the seat portion 67 and the seat retaining portion 68 of the first poppet valve assembly 65. Additionally, O-rings 85 and 86 are provided between the housing 51 and the seat portion 72 and the seat retaining portion 73 of the second poppet valve assembly 66. Moreover, in the first poppet valve assembly 65, an O-ring 87 is installed between the first poppet valve 71 and the seat retaining portion 68, and in the second poppet valve assembly 66, an O-ring 88 is installed between the second poppet valve 76 and the seat retaining portion 73.

In this double-action pilot relay, when the input air pressure Pn is increased, the diaphragms 59-1 through 59-5 move to the side of the arrow A, and, concomitant therewith, the spool 60 that is supported on the diaphragms 59-1 through 59-5 moves to the side of the arrow A. At this time, the spool 60, through this movement, presses the first poppet valve 71 downward against the biasing force of the first spring 70, and, as a result, the supply air valve 71b of the first poppet valve 71 opens the first connecting hole 67b. At this time, the first opening 60a of the spool 60 is closed by the discharge air valve 71a of the first poppet valve 71. On the other hand, the second poppet valve 76 is pushed upward by the biasing force of the second spring 75, and, accordingly, the supply air valve 76b of the second poppet valve 76 closes the second connecting hole 72b. At this time, the second opening 60b of the spool 60 is opened by the discharge air valve 76a of the second poppet valve 76.

As a result, the air that is supplied to the first supply air pressure chamber 53 through the air supplying pipe 79 enters into the interior space 69 in the first poppet valve assembly 65, and is introduced into the first output air pressure chamber 55 through the first connecting hole 67b, to be supplied to the valve 300 through the first air outputting pipe 81. On the other hand, after the air from the valve 300 has returned to the second output air pressure chamber 56 through the second air outputting pipe 82, it enters into the discharge air duct 60c from the second opening 60b of the spool 60, to be discharged into the discharge air chamber 57.

On the other hand, when the input air pressure Pn is decreased, the diaphragms 59-1 through 59-5 move to the side of the arrow B, and, concomitantly, the spool 60 that is supported on the diaphragms 59-1 through 59-5 moves to the side of the arrow B. At this time, the spool 60, through this movement, presses the second poppet valve 76 downward against the biasing force of the second spring 75, and, as a result, the supply air valve 76b of the second poppet valve 76 opens the second connecting hole 72b. At this time, the second opening 60b of the spool 60 is closed by the discharge air valve 76a of the second poppet valve 76. On the other hand, the first poppet valve 71 is pushed upward by the biasing force of the first spring 70, and, accordingly, the supply air valve 71b of the first poppet valve 71 closes the first connecting hole 72b. At this time, the first opening 60a of the spool 60 is opened by the discharge air valve 71a of the first poppet valve 71.

As a result, the air that is supplied to the second supply air pressure chamber 54 through the air supplying pipe 79 enters into the interior space 74 in the second poppet valve assembly 66, and is introduced into the second output air pressure chamber 56 through the second connecting hole 72b, to be supplied to the valve 300 through the second air outputting pipe 82. On the other hand, after the air from the valve 300 has returned to the first output air pressure chamber 5 through the first air outputting pipe 81, it enters into the discharge air duct 60c from the first opening 60a of the spool 60, to be discharged into the discharge air chamber 57.

In this way, the spool 60 and the pair of poppet valves 71 and 76 are actuated by the input air pressure Pn that is directed into the input air pressure chamber 52, where the action thereof causes the amplified output air pressures Po1 and Po2 to be outputted to the valve 300 through the air outputting pipes 81 and 82. In this case, the output air pressure Po1 can be adjusted through adjusting the pressure of the input air pressure Pn in the increasing direction when operating the valve 300 in the forward direction, and the output air pressure Po2 can be adjusted through adjusting the pressure of the input air pressure Pn in the decreasing direction when operating the valve 300 in the reverse direction.

Note that the fine connecting duct 71d that is formed in the first poppet valve 71 fulfills the role of causing the first connecting hole 67b to be blocked quickly by the supply air valve 71b of the first poppet valve 71 by causing the air of the first output air pressure chamber 55 to pass through the through hole 71c that is formed in the first poppet valve 71, to be directed towards the first discharge air duct 60c1 of the spool 60, to flow out into the first discharge air chamber 57-1, to be directed into the chamber 68b of the seat retaining portion 68, wherein the first spring 70 is contained, adding an additional biasing force to the first poppet valve 71, when the supply air valve 71b of the first poppet valve 71 is to close the first connecting hole 67b.

Moreover, the fine connecting duct 76d that is formed in the second poppet valve 76 fulfills the role of causing the second connecting hole 76b to be blocked quickly by the supply air valve 76b of the second poppet valve 76 by causing the air of the second output air pressure chamber 56 to pass through the through hole 76c that is formed in the second poppet valve 76, to be directed towards the second discharge air duct 60c2 of the spool 60, to flow out into the second discharge air chamber 57-2, to be directed into the chamber 73b of the seat retaining portion 73, wherein the second spring 75 is contained, adding an additional biasing force to the second poppet valve 76, when the supply air valve 76b of the second poppet valve 76 is to close the second connecting hole 76b.

Figure 13:
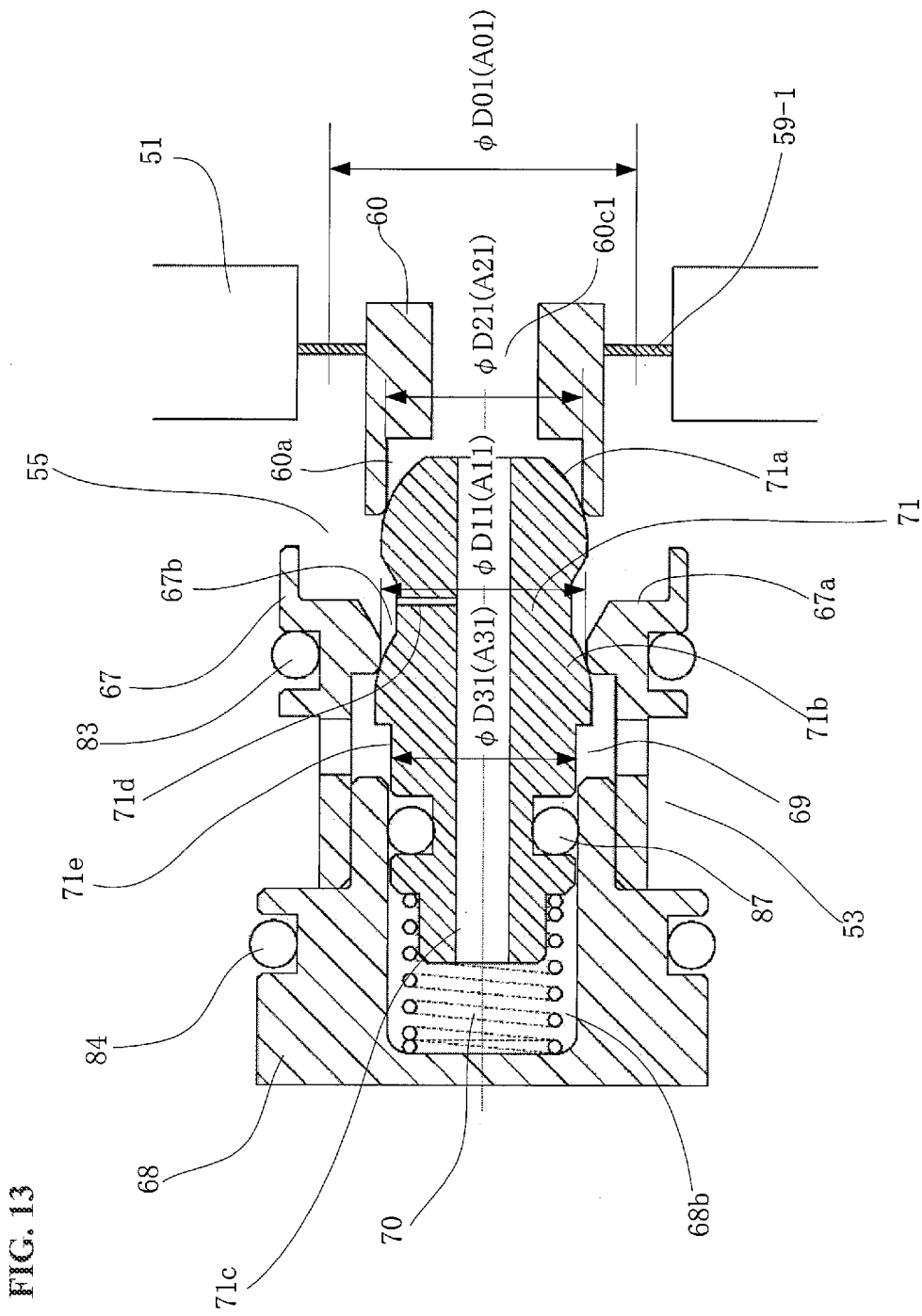
FIG. 13 is a diagram illustrating an enlargement of the surrounding of a first poppet valve in this double-action pilot relay.

In this double-action pilot relay, the first poppet valve 71 has an outer peripheral surface 71e on the output air pressure chamber 55 side, connecting to the supply air valve 71b, as a guide portion for guiding the movement of the poppet valve 71. (See FIG. 13.) Moreover, with the effective diameter of the diaphragm 59-1 as $\phi$ D01, the diameter of the first connecting hole 67b as $\phi$ D11, the diameter of the first opening 60a of the spool 60 as $\phi$ D21, and the diameter of the guide portion 71e as $\phi$ D31, and with the effective surface area of the diaphragm 59-1 as A01, the cross-sectional area of the first connecting hole 67b as A11, the cross-sectional area of the first opening 60a of the spool 60 as the A21, and the cross-sectional area of the guide portion 71e as A31, the relationships of these areas A01, A11, A21, and A31 are set as A01>A11>A21>A31. Moreover, the diameter $\phi$ D11 of the first connecting hole 67b that is opened and closed by the supply air valve 71b of the first poppet valve 71 is made large, and the difference between the diameter $\phi$ D11 of this first connecting hole 67b and the effective diameter $\phi$ D01 of the diaphragm 59-1 is made small.

Figure 14:
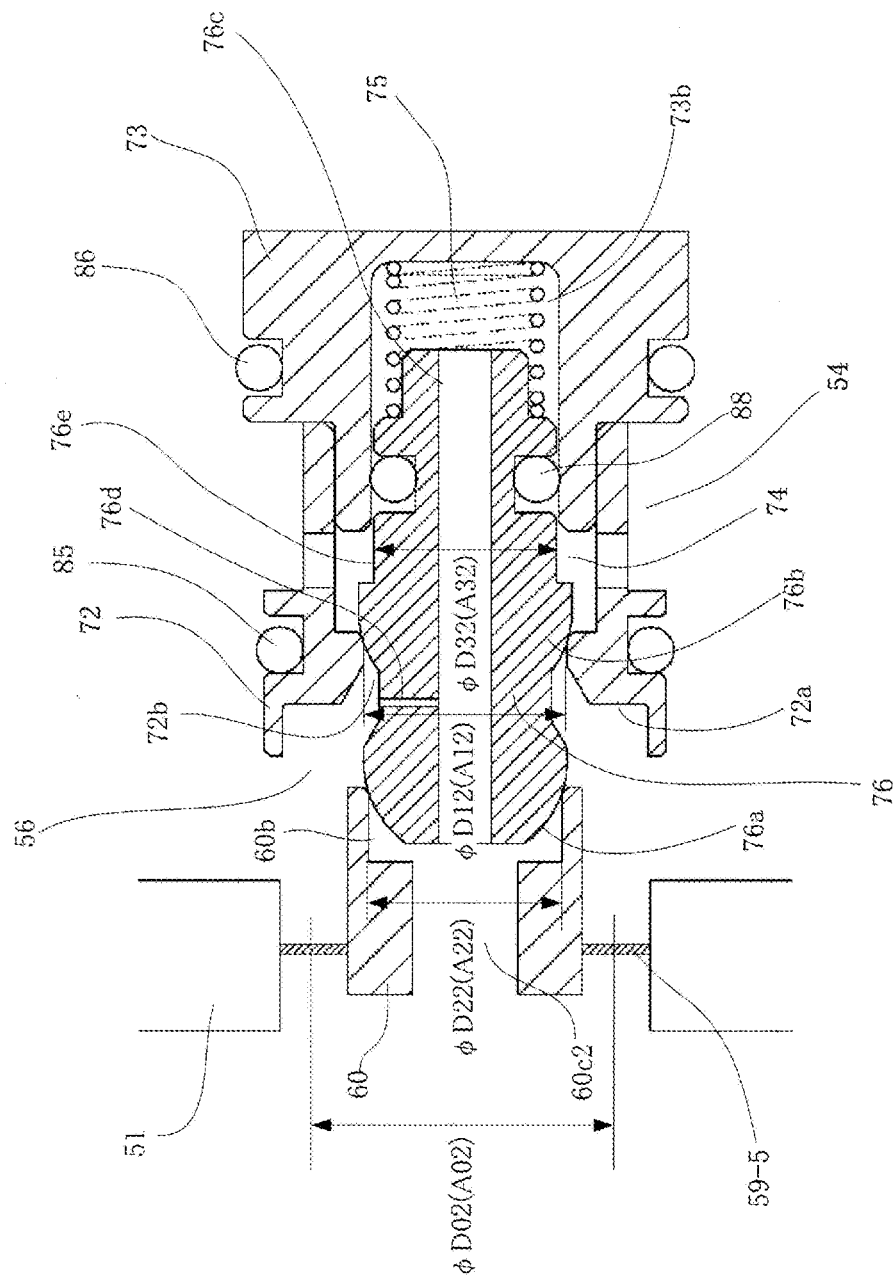
FIG. 14 is a diagram illustrating an enlargement of the surrounding of a second poppet valve in this double-action pilot relay.

Moreover, the second poppet valve 76 has an outer peripheral surface 76e on the output air pressure chamber 55 side, connecting to the supply air valve 76b, as a guide portion for guiding the movement of the poppet valve 76. (See FIG. 14.) Moreover, with the effective diameter of the diaphragm 59-5 as $\phi$ D02, the diameter of the second connecting hole 72b as $\phi$ D12, the diameter of the second opening 60b of the spool 60 as $\phi$ D22, and the diameter of the guide portion 76e as $\phi$ D32, and with the effective surface area of the diaphragm 59-5 as A02, the cross-sectional area of the second connecting hole 72b as A12, the cross-sectional area of the second opening 60b of the spool 60 as the A22, and the cross-sectional area of the guide portion 76e as A32, the relationships of these areas A02, A12, A22, and A32 are set as A02>A12>A22>A32. Moreover, the diameter $\phi$ D12 of the second connecting hole 72b that is opened and closed by the supply air valve 76b of the second poppet valve 76 is made large, and the difference between the diameter φ D12 of this second connecting hole 72b and the effective diameter φ D02 of the diaphragm 59-5 is made small.

Doing so causes the difference between the effective surface area A01 of the diaphragm 59-1 and the cross-sectional area A11 of the first connecting hole 67b to be small and the difference between the effective surface area A02 of the diaphragm 59-5 and the cross-sectional area A12 of the second connecting hole 72b to be small, so that in the equation that expresses the gain of the pilot relay, expressed as G=An/Ao, the effective surface area Ao (Ao1 and Ao2) that bears the output air pressure Po (Po1 and Po2) can be small, thus making it possible to increase the gain while leaving the effective surface area An that bears the input air pressure Pn as-is.

Moreover, in the structure in the other example, the relationship between the diameter φ D11 (the cross-sectional area A11) of the first connecting hole 67b and the diameter φ D21 (the cross-sectional area A21) of the first opening 60a of the spool 60 is φ D11>φ D21 (A11>A21). In this case, when the diameter φ D11 of the first connecting hole 67b (the supply air port diameter) and the diameter φ D21 of the first opening 60a of the spool 60 (the discharge port diameter) are made to be as close as possible, the first poppet valve 71, at the time of supplying or discharging air, is easily stabilized.

Moreover, in the structure in the other example the relationship between the diameter φ D12 (the cross-sectional area A12) of the second connecting hole 72b and the diameter φ D22 (the cross-sectional area A22) of the second opening 60b of the spool 60 is φ D12>φ D22 (A12>A22). In this case, when the diameter φ D12 of the second connecting hole 72b (the supply air port diameter) and the diameter φ D22 of the second opening 60a of the spool 60 (the discharge port diameter) are made to be as close as possible, the second poppet valve 76, at the time of supplying or discharging air, is easily stabilized.

Moreover, in the structure in the other example, the relationship between the diameter φ D21 of the first opening 60a of the spool 60 (the cross-sectional area A21) and the diameter φ D31 of the guide portion 71e (the cross-sectional area A31) is φ D21>φ D31 (A21>A31). As a result, it is possible to ensure the self-sealing of the supply air port, even when the output air pressure Po1 is at the supply air pressure Ps. Moreover, the relationship between the diameter φ D22 of the second opening 60a of the spool 60 (the cross-sectional area A22) and the diameter φ D32 of the guide portion 76e (the cross-sectional area A32) is φ D22>φ D32 (A22>A32). As a result, it is possible to ensure the self-sealing of the supply air port, even when the output air pressure Po2 is at the supply air pressure Ps.

Moreover, in this double-action pilot relay, as illustrated in FIG. 12, the spool 60 has a first discharge air duct 60c1 that penetrates through the first opening 60a, which is located at the first output air pressure chamber 55, to the first discharge air chamber 57-1, and a second discharge air duct 60c2 that penetrates through the second opening 60b, which is located at the second output air pressure chamber 56, to the second discharge air chamber 57-2, where the first discharge air duct 60c1 and the second discharge air duct 60c2 are separated by a non-duct part 60d. In this structure, the spool 60 can be divided either vertically or horizontally by the non-duct part 60d, enabling a method of assembling the spool 60 using an easy method such as screwing, thereby enabling an improvement in productivity.

In this double-action pilot relay, the first output air pressure chamber 55 is adjacent to the discharge air chamber 57-1 with a first diaphragm 59-1 interposed therebetween, and the first discharge air chamber 57-1 is adjacent to the bias chamber 58 with a second diaphragm 59-2 interposed therebetween. Moreover, the input air pressure chamber 52 is adjacent to the bias chamber 58 with a third diaphragm 59-3 interposed therebetween, and the second output air pressure chamber 56 is adjacent to the second discharge air chamber 57-2 with a fifth diaphragm 59-5 interposed therebetween.

As can be understood from such an arrangement of the chambers, in this pilot relay, the bias chamber 58 and the first discharge air chamber 57-1 are provided between the input air pressure chamber 52 and the first output air pressure chamber 55, and the second discharge air chamber 57-2 is provided between the input air pressure chamber 52 and second output air pressure chamber 56, so the input air pressure chamber 52 is adjacent to neither the first output air pressure chamber 55 nor the second output air pressure chamber 56, so there is no diaphragm, among the diaphragms 59-1 through 59-5, wherein there can be a sudden change of sign of the pressure. Because of this, the durability of the diaphragm is improved when compared to a structure wherein the input air pressure chamber 52 and the output air pressure chamber 55, 56 are adjacent to each other and wherein a diaphragm is provided therebetween.

Figure 15:
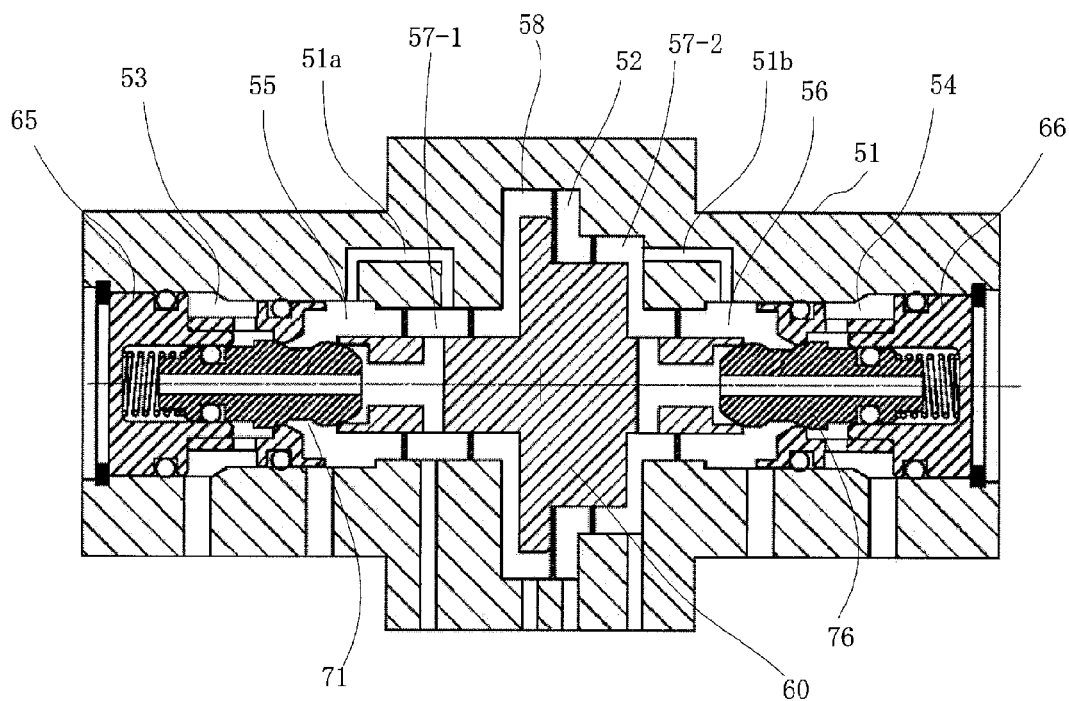
FIG. 15 is a diagram illustrating an example wherein a fine connecting duct for connecting the output air pressure chamber and the discharge air chamber is provided in a housing in this double-action pilot relay.
Figure 16:
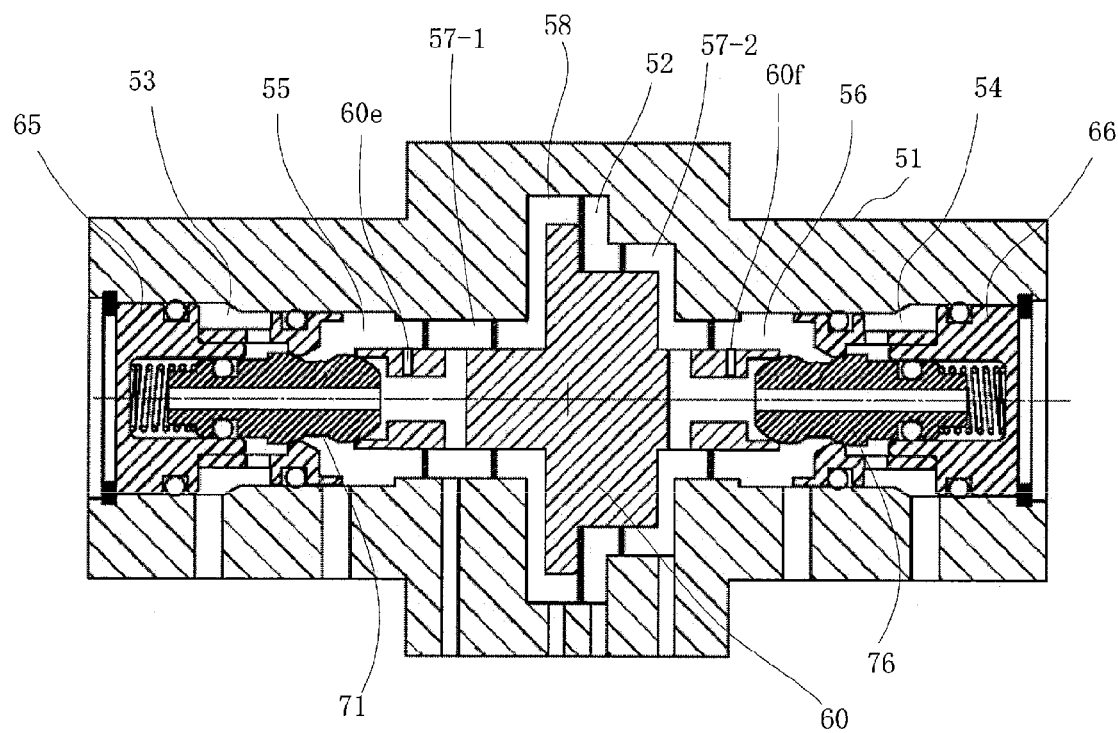
FIG. 16 is a diagram illustrating an example wherein a fine connecting duct for connecting the output air pressure chamber and the discharge air chamber is provided in a spool in this double-action pilot relay.
Figure 17:
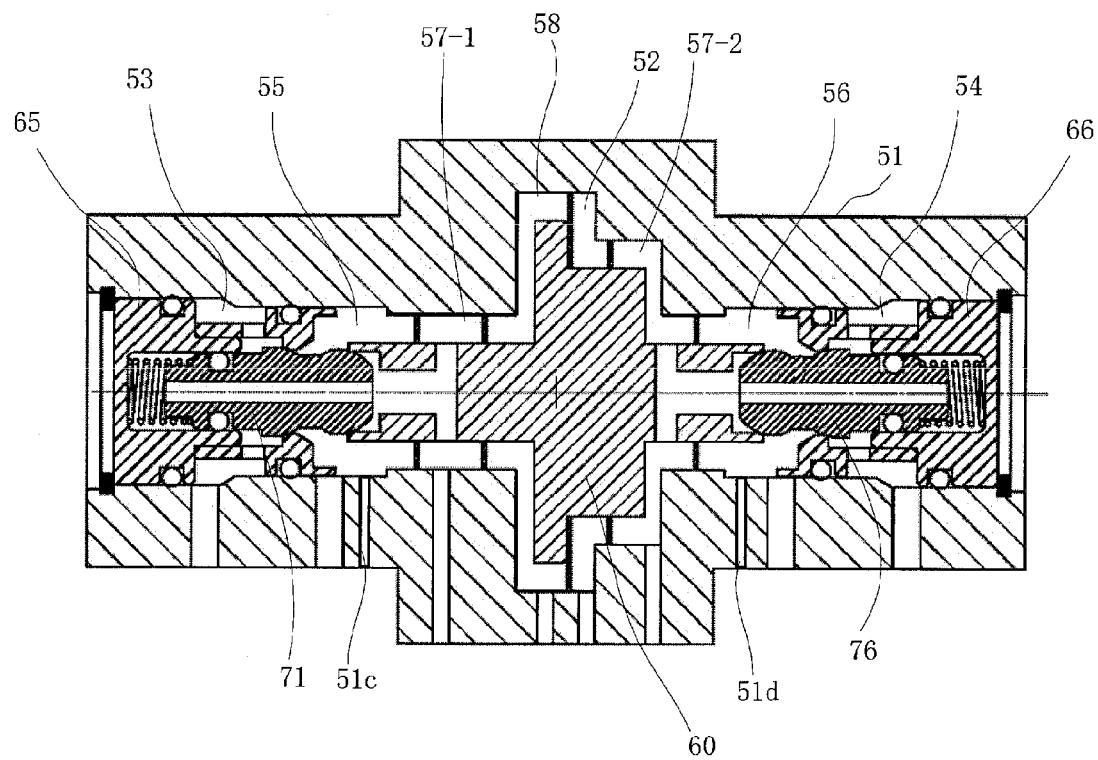
FIG. 17 is a diagram illustrating an example wherein a fine connecting duct for connecting directly the output air pressure chamber and atmosphere is provided in the housing in this double-action pilot relay.

Note that while in the other example a fine connecting duct 71d was provided in the first poppet valve 71 and a fine connecting duct 76d was provided in the second poppet valve 76, as illustrated in FIG. 15, fine connecting ducts 51a and 51b may be formed in the housing 51 where the first output air pressure chamber 55 and the first discharge air chamber 57-1 may be connected by the fine connecting duct 51a, and the second output air pressure chamber 56 and the second discharge air chamber 57-2 may be connected by the fine connecting duct 51b. Note that, as illustrated in FIG. 16, fine connecting ducts 60e and 60f may be formed in the spool 60 where the first output air pressure chamber 55 and the first discharge air chamber 57-1 may be connected by the fine connecting duct 60e, and the second output air pressure chamber 56 and the second discharge air chamber 57-2 may be connected by the fine connecting duct 60f. Moreover, as illustrated in FIG. 17, fine connecting ducts 51c and 51d may be formed in the housing 51, where the first output air pressure chamber 55 may be connected by the fine connecting duct 51c, and the second output air pressure chamber 56 may be connected by the fine connecting duct 51d, to be connected directly to atmosphere.

Moreover, while in the second form of embodiment a bias chamber 58 is provided between the input air pressure chamber 52 and the first discharge air chamber 57-1, the bias chamber 58 may instead be provided between the first output air pressure chamber 55 and the first discharge air chamber 57-1.

Figure 18:
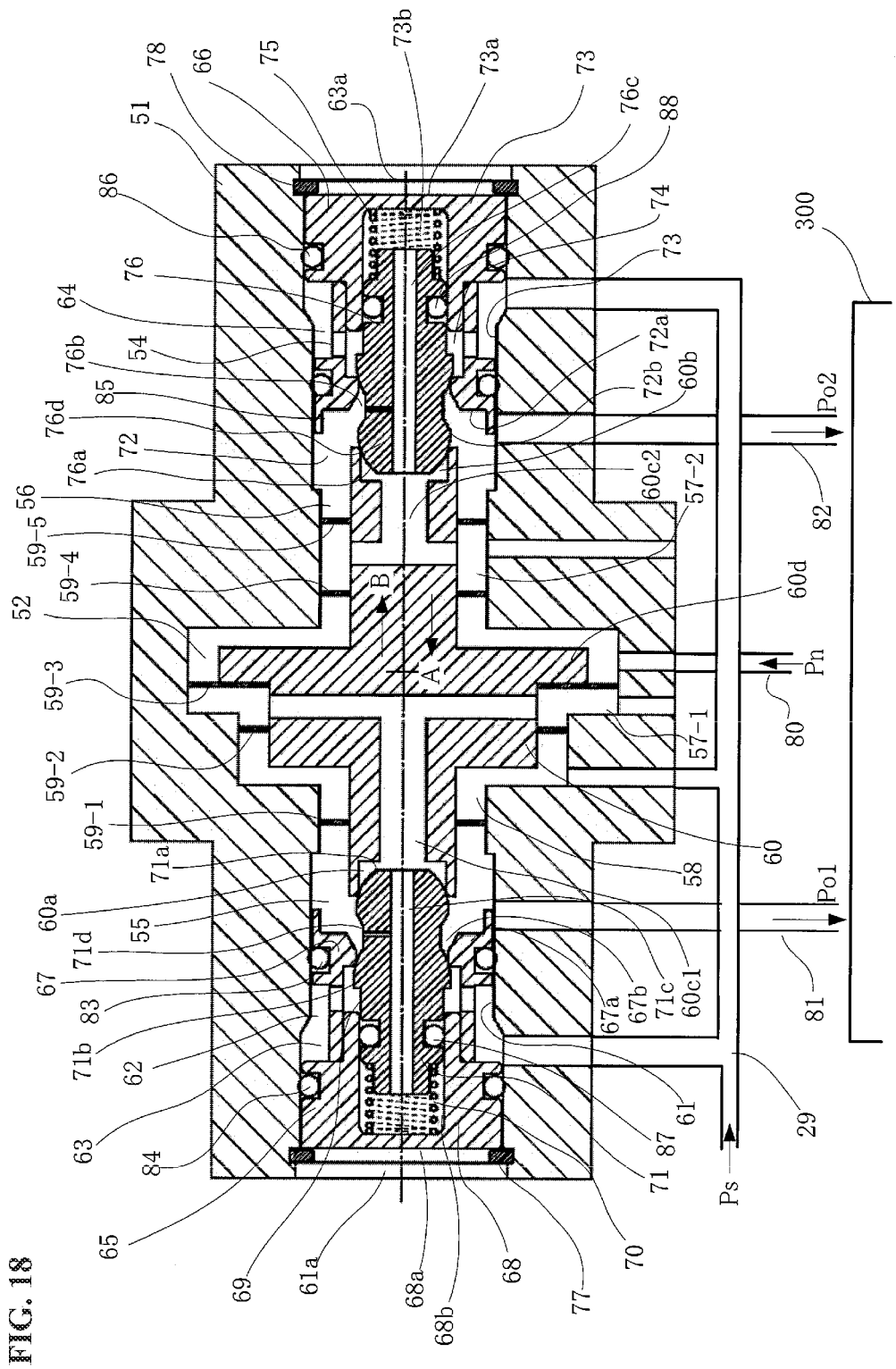
FIG. 18 is a diagram illustrating an example wherein a bias chamber is provided between a first output air pressure chamber and a first discharge air chamber in this double-action pilot relay.

FIG. 18 shows an example of the provision of the bias chamber 58 between the first output air pressure chamber 55 and the first discharge air chamber 57-1. In this example, the bias chamber 58 is adjacent to the first output air pressure chamber 55, with the first diaphragm 59-1 therebetween, and adjacent to the first discharge air chamber 57-1, with the second diaphragm 59-2 therebetween. Moreover, the input air pressure chamber 52 is adjacent to first discharge air chamber 57-1 with a third diaphragm 59-3 interposed therebetween, and adjacent to the second discharge air chamber 57-2 with a fourth diaphragm 59-4 interposed therebetween. Moreover, the second discharge air chamber 57-2 is adjacent to the second output air pressure chamber 56 with a fifth diaphragm 59-5 interposed therebetween.

In this structure is well, a first discharge air duct 60c1 for connecting the first opening 60a to the first discharge air chamber 57-1, and a second discharge air duct 60c2 for connecting the second opening 60b to the second discharge air chamber 57-2 may be provided in the spool 60, and the first discharge air duct 60c1 and the second discharge air duct 60c2 may be separated by a non-duct portion 60d.

While in this structure the first discharge air duct 60c1 is open to the first discharge air chamber 57-1 at a central portion of the spool 60, instead the spool 60 may be divided either vertically or horizontally by the non-duct portion 60d, to facilitate easy assembly of the spool 60 through screwing, or the like, to improve productivity.

Moreover, in this structure as well, the input air pressure chamber 52 is adjacent to neither the first output air pressure chamber 55 nor the second output air pressure chamber 56, so there is no diaphragm that divides between the input air pressure chamber 52 and the output air pressure chambers 55 and 56, which improves the durability of the diaphragm.

Figure 19:
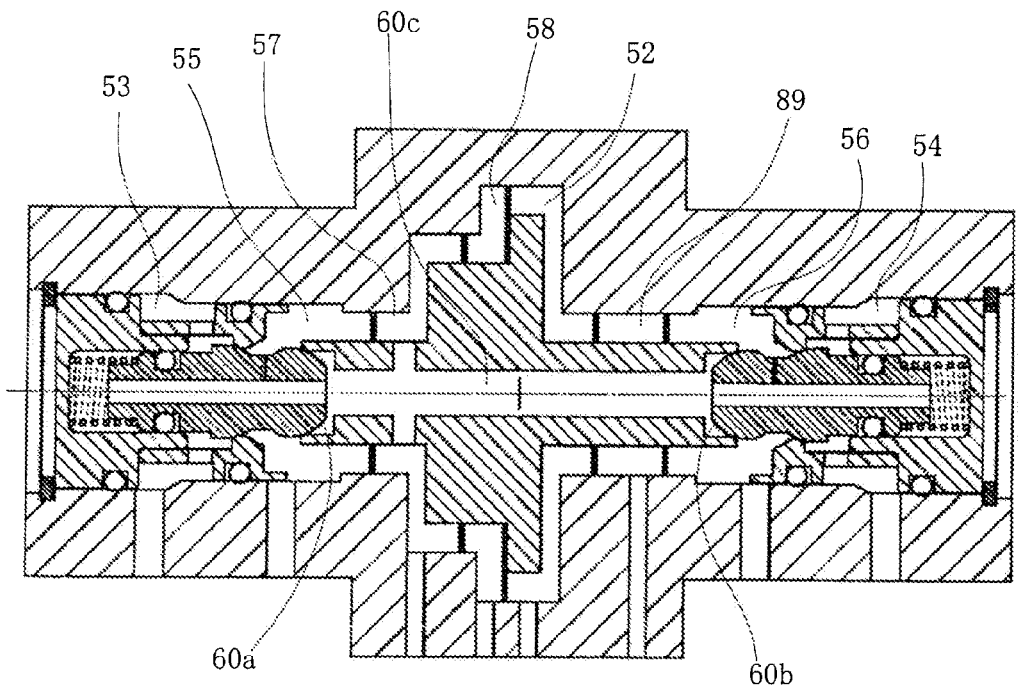
FIG. 19 is a diagram illustrating an example wherein a bias chamber is provided between an input air pressure chamber and a second output air pressure chamber in this double-action pilot relay.
Figure 20:
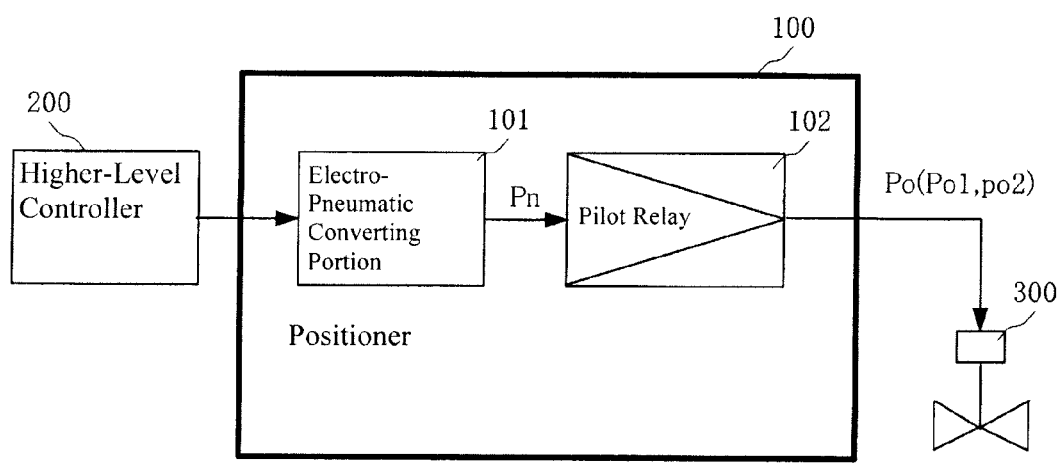
FIG. 20 is a structural diagram illustrating the critical components in a positioner that uses a pilot relay.
Figure 21:
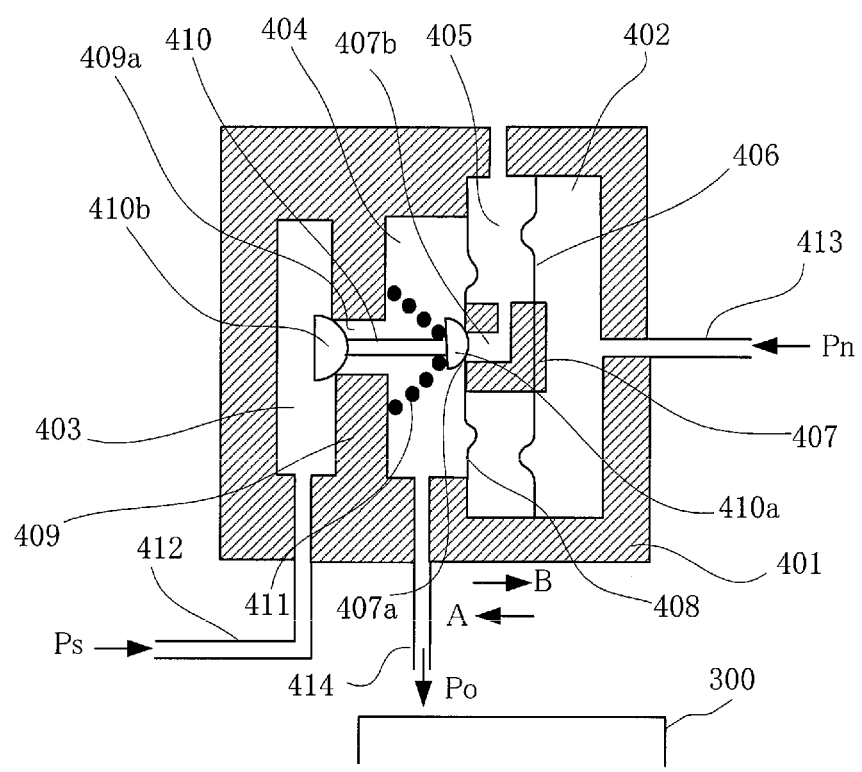
FIG. 21 is a diagram illustrating a structure of a conventional single-action pilot relay.

Moreover, as illustrated in FIG. 19, a through hole for connecting the first opening 60a and the second opening 60b may be provided in the spool 60, a bias chamber 89 may be provided instead of the second discharge air chamber 57-2 between the input air pressure chamber 52 and the second output air pressure chamber 56, the first discharge air chamber 57-1 may be a single discharge air chamber 57, and the air that is drawn in from the first opening 60a and the second opening 60b of the spool 60 may be discharged into this discharge air chamber 57.

Moreover, while in the examples set forth above, $\phi D0$ was about 12 mm and $\phi D1$ was about 8 mm, these are merely examples, where the difference between $\phi D0$ and $\phi D1$, that is, the difference between A0 and A1, should be smaller than that in the conventional structure, where the difference may be reduced in accordance with the ratio of A0 and A1 (no more than about 2.5 times).

The pilot relay according to the present invention can be used in a positioner, or the like, that controls the degree of opening of a pneumatically actuated regulator valve as a pressure signal amplifying device for amplifying an input air pressure signal.

The invention claimed is:

1. A pilot relay comprising:
an input air pressure chamber, a supply air pressure chamber, an output air pressure chamber, and a discharge air chamber connected to atmosphere, formed within a housing;
a diaphragm dislocating by input air pressure that is directed into the input air pressure chamber;
a moveable body having an opening located in the output air pressure chamber, and a discharge air duct connecting the opening to the discharge air chamber, the moveable body being supported by the diaphragm to move within the housing;
a poppet valve provided to move through a connecting hole formed in a dividing wall dividing the supply air pressure chamber and the output air pressure chamber, and has, integrally, a discharge air valve opening and closing the opening of the moveable body, and a supply air valve opening and closing the connecting hole;
a spring member biasing the poppet valve in a direction wherein the supply air valve closes the connecting hole; and
a poppet valve assembly having a space containing the spring member, and the dividing wall, wherein the poppet valve and the spring member are held in a state wherein the discharge air valve protrudes from the connecting hole formed in the dividing wall, wherein the poppet valve comprises a through hole connecting to both the space containing the spring member and the discharge air chamber, and a fine connecting duct connecting the through hole to the output air pressure chamber.

2. A pilot relay comprising:
an input air pressure chamber, a first supply air pressure chamber, a second supply air pressure chamber, a first output air pressure chamber, a second output air pressure chamber, a first discharge air chamber, and a second discharge air chamber, formed within a housing;
a diaphragm dislocating by input air pressure that is directed into the input air pressure chamber;
a moveable body having a first opening located in the first output air pressure chamber, a second opening located in the second output air pressure chamber, a first discharge air duct connecting the first opening to the first discharge air chamber, and a second discharge air duct connecting the second opening to the second discharge air chamber, the moveable body being supported by the diaphragm to move within the housing;
a first poppet valve provided to move through a first connecting hole formed in a first dividing wall dividing the first supply air pressure chamber and the first output air pressure chamber, and has, integrally, a first discharge air valve opening and closing the first opening of the moveable body, and a first supply air valve opening and closing the first connecting hole;
a second poppet valve provided to move through a second connecting hole formed in a second dividing wall dividing the second supply air pressure chamber and the second output air pressure chamber, and has, integrally, a second discharge air valve opening and closing the second opening of the moveable body, and a second supply air valve opening and closing the second connecting hole;
a first spring member biasing the first poppet valve in a direction wherein the first supply air valve closes the first connecting hole;
a second spring member biasing the second poppet valve in a direction wherein the second supply air valve closes the second connecting hole;
a first poppet valve assembly having a space containing the first spring member and the first dividing wall, wherein the first poppet valve and the first spring member are held in a state wherein the first discharge air valve protrudes from the first connecting hole formed in the first dividing wall; and
a second poppet valve assembly having a space containing the second spring member and the second dividing wall, wherein the second poppet valve and the second spring member are held in a state wherein the second discharge air valve protrudes from the second connecting hole formed in the second dividing wall, wherein
the first poppet valve comprises a first through hole connecting to either the space containing the first spring member, which is connected to atmosphere, or to the first discharge air chamber, and a first fine connecting duct connecting the first through hole to the first output air pressure chamber; and
the second poppet valve comprises a second through hole connecting to either the space containing the second spring member, which is connected to atmosphere, or to the second discharge air chamber, and a second fine connecting duct connecting the second through hole to the second output air pressure chamber.

* * * * *